(12) United States Patent
Pishdadian et al.

(10) Patent No.: US 12,215,981 B2
(45) Date of Patent: Feb. 4, 2025

(54) MULTI-MODAL ROUTE GENERATION SYSTEM

(71) Applicant: Lyft, Inc., San Francisco, CA (US)

(72) Inventors: Keyan Pishdadian, Seattle, WA (US); Mikhail Skobov, Seattle, WA (US); Ian Todd Williams, Seattle, WA (US)

(73) Assignee: Lyft, Inc., San Francisco, CA (US)

( * ) Notice: Subject to any disclaimer, the term of this patent is extended or adjusted under 35 U.S.C. 154(b) by 663 days.

(21) Appl. No.: 16/836,141

(22) Filed: Mar. 31, 2020

(65) Prior Publication Data

US 2021/0302175 A1    Sep. 30, 2021

(51) Int. Cl.
| | | |
|---|---|---|
| G06Q 10/02 | (2012.01) | |
| G01C 21/34 | (2006.01) | |
| G01C 21/36 | (2006.01) | |
| G06Q 50/40 | (2024.01) | |

(52) U.S. Cl.
CPC ..... *G01C 21/3423* (2013.01); *G01C 21/3492* (2013.01); *G01C 21/362* (2013.01); *G01C 21/3626* (2013.01); *G01C 21/3697* (2013.01); *G06Q 10/02* (2013.01); *G06Q 50/40* (2024.01)

(58) Field of Classification Search
None
See application file for complete search history.

(56) References Cited

U.S. PATENT DOCUMENTS

| | | | |
|---|---|---|---|
| 6,208,934 B1 | 3/2001 | Bechtolsheim et al. | |
| 8,489,641 B1 | 7/2013 | Seefeld et al. | |
| 9,057,612 B1 | 6/2015 | Savvopoulos | |
| 9,679,487 B1 | 6/2017 | Hayward | |
| 9,689,693 B2 * | 6/2017 | Newlin | G08G 1/0104 |
| 9,713,963 B2 | 7/2017 | Liu et al. | |
| 9,752,890 B2 | 9/2017 | Meisels et al. | |
| 10,248,120 B1 | 4/2019 | Siegel et al. | |
| 10,248,913 B1 | 4/2019 | Gururajan | |
| 10,249,120 B2 | 4/2019 | Ahearn et al. | |
| 10,331,727 B2 | 6/2019 | Naghdy et al. | |
| 10,371,539 B2 | 8/2019 | Broyles et al. | |

(Continued)

FOREIGN PATENT DOCUMENTS

| | | | | |
|---|---|---|---|---|
| CN | 107240168 A | * | 10/2017 | G07C 5/0816 |
| CN | 107289958 A | * | 10/2017 | G01C 21/34 |

(Continued)

OTHER PUBLICATIONS

U.S. Appl. No. 18/355,844, filed Feb. 15, 2024, Office Action.

(Continued)

*Primary Examiner* — Redhwan K Mawari
*Assistant Examiner* — Kai N Wang
(74) *Attorney, Agent, or Firm* — Keller Preece PLLC

(57) ABSTRACT

Methods and systems for improved generation of multi-modal transportation routes are provided. In one embodiment, a method is provided that includes generating a network of route segments. At least a portion of the route segments may be associated with a rideable modality. At least one route segment of the network may be updated based on a changed condition of the rideable modality. Routes may be generated, based on the network, that utilize the rideable modality and at least one of the routes may be sent to a computing device for display.

20 Claims, 11 Drawing Sheets

(56) References Cited

U.S. PATENT DOCUMENTS

| | | | |
|---|---|---|---|
| 10,408,624 B2 | 9/2019 | Salowitz et al. | |
| 10,419,878 B1 | 9/2019 | Sanchez et al. | |
| 10,545,026 B1 | 1/2020 | Schaefer | |
| 10,594,806 B2* | 3/2020 | Ishikawa | G08G 5/0043 |
| 10,636,109 B2 | 4/2020 | Bonanni, III et al. | |
| 10,648,822 B2* | 5/2020 | Newlin | G01C 21/20 |
| 10,746,555 B1 | 8/2020 | Spielman et al. | |
| 10,914,600 B1* | 2/2021 | Spielman | G06Q 30/0284 |
| 11,100,346 B2* | 8/2021 | Beaurepaire | G06V 20/20 |
| 11,226,208 B2* | 1/2022 | Spielman | G01C 21/3484 |
| 11,473,924 B2 | 10/2022 | Spielman et al. | |
| 11,703,336 B2 | 7/2023 | Spielman et al. | |
| 11,733,049 B2 | 8/2023 | Spielman et al. | |
| 2002/0161520 A1 | 10/2002 | Dutta et al. | |
| 2005/0187707 A1 | 8/2005 | Yokota et al. | |
| 2005/0251331 A1 | 11/2005 | Kreft | |
| 2007/0073562 A1 | 3/2007 | Brice et al. | |
| 2008/0208443 A1 | 8/2008 | Massie et al. | |
| 2008/0248815 A1 | 10/2008 | Busch | |
| 2009/0177387 A1 | 7/2009 | Liu | |
| 2009/0271109 A1 | 10/2009 | Lee et al. | |
| 2009/0319163 A1 | 12/2009 | Sutter et al. | |
| 2011/0040479 A1 | 2/2011 | Uyama et al. | |
| 2012/0010816 A1 | 1/2012 | Uyama et al. | |
| 2012/0173134 A1 | 7/2012 | Gutman | |
| 2012/0173135 A1 | 7/2012 | Gutman | |
| 2013/0016012 A1 | 1/2013 | Beauregard | |
| 2013/0073323 A1 | 3/2013 | Zacharia | |
| 2013/0253833 A1 | 9/2013 | Tuukkanen | |
| 2014/0005941 A1 | 1/2014 | Paek et al. | |
| 2014/0006215 A1 | 1/2014 | Hornthal et al. | |
| 2014/0052714 A1 | 2/2014 | Brodziak et al. | |
| 2014/0351037 A1 | 11/2014 | Shaam et al. | |
| 2014/0365113 A1 | 12/2014 | McGavran et al. | |
| 2015/0032366 A1 | 1/2015 | Man et al. | |
| 2015/0081418 A1 | 3/2015 | Sahai | |
| 2015/0160028 A1 | 6/2015 | Burrows et al. | |
| 2015/0187107 A1 | 7/2015 | Vander Mey et al. | |
| 2015/0253143 A1 | 9/2015 | Bailiang et al. | |
| 2016/0031506 A1 | 2/2016 | Lloyd et al. | |
| 2016/0076905 A1 | 3/2016 | Broadbent et al. | |
| 2016/0138925 A1 | 5/2016 | Takahashi | |
| 2016/0203422 A1 | 7/2016 | Demarchi et al. | |
| 2016/0298977 A1 | 10/2016 | Newlin et al. | |
| 2016/0320194 A1 | 11/2016 | Liu et al. | |
| 2016/0356603 A1 | 12/2016 | Hajj et al. | |
| 2016/0358471 A1 | 12/2016 | Hajj et al. | |
| 2016/0371800 A1 | 12/2016 | Kirshenboim | |
| 2017/0074669 A1 | 3/2017 | Newlin et al. | |
| 2017/0123618 A1 | 5/2017 | Porcella | |
| 2017/0153113 A1 | 6/2017 | Gotoh et al. | |
| 2017/0169366 A1* | 6/2017 | Klein | G06Q 10/025 |
| 2017/0178268 A1* | 6/2017 | Ishikawa | G06Q 50/40 |
| 2017/0185271 A1 | 6/2017 | Manoharan et al. | |
| 2017/0191841 A1 | 7/2017 | Marueli et al. | |
| 2017/0213273 A1* | 7/2017 | Dietrich | G06Q 20/4016 |
| 2017/0268891 A1 | 9/2017 | Dyrnaes et al. | |
| 2017/0330111 A1 | 11/2017 | Vogel et al. | |
| 2017/0357914 A1 | 12/2017 | Tulabandhula et al. | |
| 2017/0358113 A1 | 12/2017 | Bray et al. | |
| 2017/0359695 A1 | 12/2017 | Aerts | |
| 2017/0370735 A1 | 12/2017 | Salowitz | |
| 2018/0051995 A1 | 2/2018 | Delling et al. | |
| 2018/0052002 A1 | 2/2018 | Delling et al. | |
| 2018/0060778 A1* | 3/2018 | Guo | G01C 21/3667 |
| 2018/0091604 A1 | 3/2018 | Yamashita et al. | |
| 2018/0113914 A1 | 4/2018 | Mehedy et al. | |
| 2018/0135989 A1 | 5/2018 | Schreier et al. | |
| 2018/0156623 A1 | 6/2018 | West et al. | |
| 2018/0204252 A1 | 7/2018 | Boulard et al. | |
| 2018/0211337 A1 | 7/2018 | Ghaddar et al. | |
| 2018/0244288 A1 | 8/2018 | Glaser et al. | |
| 2018/0341880 A1 | 11/2018 | Kislovskiy et al. | |
| 2018/0341881 A1 | 11/2018 | Kislovskiy et al. | |
| 2018/0341887 A1 | 11/2018 | Kislovskiy et al. | |
| 2018/0341888 A1 | 11/2018 | Kislovskiy et al. | |
| 2018/0341895 A1 | 11/2018 | Kislovskiy et al. | |
| 2018/0342033 A1 | 11/2018 | Kislovskiy et al. | |
| 2018/0342034 A1 | 11/2018 | Kislovskiy et al. | |
| 2018/0342113 A1 | 11/2018 | Kislovskiy et al. | |
| 2018/0374032 A1 | 12/2018 | Pan et al. | |
| 2019/0017839 A1 | 1/2019 | Eyler et al. | |
| 2019/0046112 A1 | 2/2019 | Blanchard et al. | |
| 2019/0056233 A1 | 2/2019 | Liu et al. | |
| 2019/0101401 A1 | 4/2019 | Balva | |
| 2019/0122315 A1 | 4/2019 | Valverde, Jr. et al. | |
| 2019/0146500 A1 | 5/2019 | Yalla | |
| 2019/0182626 A1 | 6/2019 | Miller et al. | |
| 2019/0219411 A1 | 7/2019 | Christen et al. | |
| 2019/0236743 A1 | 8/2019 | Bonanni, III et al. | |
| 2019/0251503 A1 | 8/2019 | Simpson | |
| 2019/0251509 A1 | 8/2019 | Simpson | |
| 2019/0272589 A1 | 9/2019 | Simpson | |
| 2019/0277642 A1 | 9/2019 | Schmelzer et al. | |
| 2019/0301891 A1 | 10/2019 | Rowitch | |
| 2019/0318309 A1 | 10/2019 | Vaideeswaran et al. | |
| 2019/0318443 A1 | 10/2019 | Goldman-Shenhar | |
| 2019/0318818 A1 | 10/2019 | Chaudhuri et al. | |
| 2019/0327579 A1 | 10/2019 | Rankin et al. | |
| 2019/0339087 A1 | 11/2019 | Jindal et al. | |
| 2019/0340928 A1 | 11/2019 | Goldman et al. | |
| 2019/0370924 A1 | 12/2019 | Kassner et al. | |
| 2019/0371472 A1 | 12/2019 | Blanchard et al. | |
| 2019/0375301 A1 | 12/2019 | Whitt et al. | |
| 2019/0383623 A1 | 12/2019 | Aich et al. | |
| 2020/0041291 A1* | 2/2020 | Dunnette | G06Q 30/0283 |
| 2020/0051192 A1 | 2/2020 | Didier et al. | |
| 2020/0104761 A1 | 4/2020 | Aich et al. | |
| 2020/0104962 A1 | 4/2020 | Aich et al. | |
| 2020/0109956 A1 | 4/2020 | Nakamura et al. | |
| 2020/0117204 A1 | 4/2020 | Lindemann et al. | |
| 2020/0134765 A1 | 4/2020 | Majima et al. | |
| 2020/0191587 A1 | 6/2020 | Fuchs | |
| 2020/0300645 A1 | 9/2020 | Schirano | |
| 2020/0378771 A1* | 12/2020 | Beaurepaire | G06Q 30/0284 |
| 2020/0410375 A1* | 12/2020 | Seagraves | G06N 5/04 |
| 2021/0065114 A1 | 3/2021 | Thompson et al. | |

FOREIGN PATENT DOCUMENTS

| | | | | |
|---|---|---|---|---|
| CN | 108898241 A | * | 11/2018 | G06Q 10/02 |
| CN | 110648267 A | * | 1/2020 | G06K 17/0022 |
| WO | WO-2015140954 A1 | * | 9/2015 | B60L 53/30 |
| WO | 2018/219337 A1 | | 12/2018 | |

OTHER PUBLICATIONS

U.S. Appl. No. 18/355,844, filed Apr. 8, 2024, Notice of Allowance.
Search Report and Rule 62 EPC as received in European application 20875579.3 dated Oct. 10, 2023.
Wagner et al.; Public Transit Routing with Unrestricted Walking; 17th Workshop on Algorithmic Approaches for Transportation Modelling, Optimization, and Systems (ATMOS 2017); http://i11www.iti.kit.edu/PublicTransitData/Switzerland/; retrieved Feb. 17, 2020; (14 pages).
Pajor, Thomas; Algorithm Engineering for Realistic Journey Planning in Transportation Networks; Nov. 15, 2013 (278 pages).
Delling et al.; Customizable Route Planning; Microsoft Research Silicon Valley, Karlsruhe Institute of Technology; retrieved Feb. 17, 2020; (12 pages).
Delling et al.; Computing Multimodal Journeys in Practice; Microsoft Research Silicon Valley; Karlsruhe Institute of Technology; retrieved Feb. 17, 2020; (12 pages).
Delling et al.; Computing and Evaluating Multimodal Journeys; Microsoft Research Silicon Valley; Karlsruhe Institute of Technology; retrieved Feb. 17, 2020; (17 pages).
Baum et ak,; UnLimited TRAnsfers for Multi-Modal Route Planning: An Efficient Solution ; Karlsruhe Institute of Technology; Jul. 4, 2019 (18 pages).
Hoek et al.; osrm-backend/profiles/bicycle.lua; https://github.com/Project-OSRM/osrm-backend/blob/master/profiles/bicycle.lua; Dec. 1, 2019; retrieved Feb. 17, 2020; (15 pages).

(56) References Cited

OTHER PUBLICATIONS

Nguyen, Huyen Chau; Engineering Multimodal Transit Route Planning; Karlsruhe institute of Technology; Department of Informatics Institute of Theoretical Computer Science; Oct. 31, 2017; (64 pages).
Kirchler, Dominik; Efficient routing on multi-modal transportation networks; Ecole Polytechnique X; Oct. 28, 2013; (148 pages).
Dibbelt, Julian Matthias; Engineering Algorithms for Route Planning in Multimodal Transportation Networks; Karlsruhe Institute of Technology; Feb. 3, 2016 (225 pages).
Dellling et al.; Round-Based Public Transit Routing; Microsoft Research Silicon Valley; Karlsruhe Institute of Technology; Feb. 2016; retrieved Feb. 17, 2020; (11 pages).
Delling et al.; Fast and Exact Public Transit Routing with Restricted Pareto Sets; 2019; (12 pages).
Examination Report as received in Australian application 2020361447 dated Apr. 22, 2022.
Office Action as received in European application 20875579.3 dated May 13, 2022.
Office Action as received in Mexican application MX/a/2022/004182 dated Jun. 13, 2022 [no English translation available].
International Search Report and Written Opinion for App. No. PCT/US20/46673 dated Nov. 9, 2020 (8 pages).
NPL, Lee, Misuk et al., An Analysis of Destination Choice for Opaque Airline Products Using Multi-dimensional Binary Logit Models, Transportation Research, Part A, 46 (2012) (http://dx.doi.orgil 0.1016/j.tra.2012.08.009.
U.S. Appl. No. 16/595,394, filed Dec. 19, 2019, Office Action.
U.S. Appl. No. 16/595,394, filed Jun. 9, 2020, Office Action.
U.S. Appl. No. 16/595,394, filed Oct. 15, 2020, Office Action.
U.S. Appl. No. 16/595,394, filed Sep. 17, 2021, Notice of Allowance.
U.S. Appl. No. 17/648,148, filed Dec. 20, 2022, Ex Parte Quayle Action.
U.S. Appl. No. 17/648,148, filed Mar. 1, 2023, Notice of Allowance.
U.S. Appl. No. 16/595,429, filed Jan. 8, 2020, Office Action.
U.S. Appl. No. 16/595,429, filed Jun. 5, 2020, Office Action.
U.S. Appl. No. 16/595,429, filed Oct. 8, 2020, Notice of Allowance
U.S. Appl. No. 16/595,399, filed Jan. 6, 2020, Office Action.
U.S. Appl. No. 16/595,399, filed Jun. 18, 2020, Office Action.
U.S. Appl. No. 16/595,399, filed Dec. 16, 2020, Office Action.
U.S. Appl. No. 16/595,399, filed Jun. 9, 2021, Office Action.
U.S. Appl. No. 16/595,399, filed Nov. 23, 2021, Notice of Allowance.
U.S. Appl. No. 16/595,399, filed Mar. 24, 2022, Office Action.
U.S. Appl. No. 16/595,399, filed Oct. 5, 2022, Office Action.
U.S. Appl. No. 16/595,399, filed Mar. 1, 2023, Notice of Allowance.
U.S. Appl. No. 16/595,387, filed Jan. 9, 2020, Office Action.
U.S. Appl. No. 16/595,387, filed Jun. 11, 2020, Notice of Allowance.
U.S. Appl. No. 16/993,532, filed Dec. 8, 2021, Office Action.
U.S. Appl. No. 16/993,532, filed Apr. 15, 2022, Notice of Allowance.
U.S. Appl. No. 17/816,201, filed Nov. 25, 2022, Office Action.
U.S. Appl. No. 17/816,201, filed Feb. 22, 2023, Notice of Allowance.

\* cited by examiner

MULTI-MODAL ROUTE GENERATION SYSTEM

BACKGROUND

Individuals desiring transportation (e.g., transportation by vehicle) between two locations can submit transportation requests to transportation providers. In particular, users may identify specific locations between which transportation is desired. In response, transportation providers may identify multiple modes of transportation that may be used to transport the user between the identified locations.

SUMMARY

The present disclosure presents new and innovative systems and method for generating multi-modal routes for transportation. In a first aspect, a system is provided that includes a processor and a memory. The memory may store instructions which, when executed by the processor, cause the processor to generate a network of route segments based on at least one rideable modality and update at least one route segment from the network of route segments based on a changed condition of the at least one rideable modality. The memory may store further instructions which, when executed by the processor, cause the processor to generate, based on the network, routes utilizing the at least one rideable modality and send, for display, at least one of the routes to a computing device.

In a second aspect according to the first aspect, the at least one rideable modality is a first type of rideable vehicle and the network further includes route segments based on at least one additional modality selected from the group consisting of automobiles, buses, trains, ferries, and a second type of rideable vehicle.

In a third aspect according to the second aspect, the network includes at least two subnetworks of route segments associated with the at least one rideable modality and the at least one additional modality In a fourth aspect according to the third aspect, the at least two subnetworks are connected by supplementary route segments.

In a fifth aspect according to any of the first through fourth aspects, the routes are generated in response to a request for transportation from a first location to a second location.

In a sixth aspect according to the fifth aspect, generating the routes further includes generating walking segments between at least one of (i) the first location and the network and (ii) the second location and the network.

In a seventh aspect according to any of the first through sixth aspects, the changed condition is determining that a dock is full or empty.

In an eighth aspect according to any of the first through seventh aspects, the changed condition is determining that at least one dockless rideable vehicle is no longer available and/or that at least one dockless rideable vehicle is available.

In a ninth aspect according to any of the first through eighth aspects, generating the network further comprises removing at least one route segment that does not meet at least one of (i) a time requirement, (ii) a cost requirement, (iii) a distance requirement, and (iv) a vertical gain requirement.

In a tenth aspect according to any of the first through ninth aspects, the at least one of the routes sent to the computing device are selected based on a preference regarding at least one of cost, travel time, travel distance, wait times, number of transfers, traffic, and modalities utilized during transportation.

In an eleventh aspect according to any of the first through tenth aspects, the routes are generated based on optimality constraints including at least one of a travel time, a travel distance, a wait time, a number of transfers, an amount of traffic congestion, and an amount of vertical gain.

In a twelfth aspect according to any of the first through eleventh aspects, at least one of the routes is generated to include an external route segment not included within the network.

In a thirteenth aspect, a method is provided implementing at least one of the first through twelfth aspects.

In a fourteenth aspect, a non-transitory, computer-readable medium is provided storing instructions which, when executed by a processor, cause the processor to implement at least one of the first through twelfth aspects.

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the disclosed subject matter.

DETAILED DESCRIPTION OF EXAMPLE EMBODIMENTS

Aspects of the present disclosure involve systems and methods for generating transportation proposals that generate routes between locations. The routes may include multiple segments that are associated with different types of vehicles (i.e., modalities). In certain instances, the modalities may include rideable vehicles, such as bicycles or scooters. The modalities may also include, e.g., automobiles, buses, trains, and/or ferries. The disclosed system enables the use of network-based route generation techniques to generate multimodal routes for transportation that utilize rideable vehicles. Generated routes may be transmitted to a computing device (e.g., a mobile device), thereby providing users with the ability to determine a route and/or mode of transportation best suited to support the user's transportation needs and/or service the user's transportation request.

Figure 1:
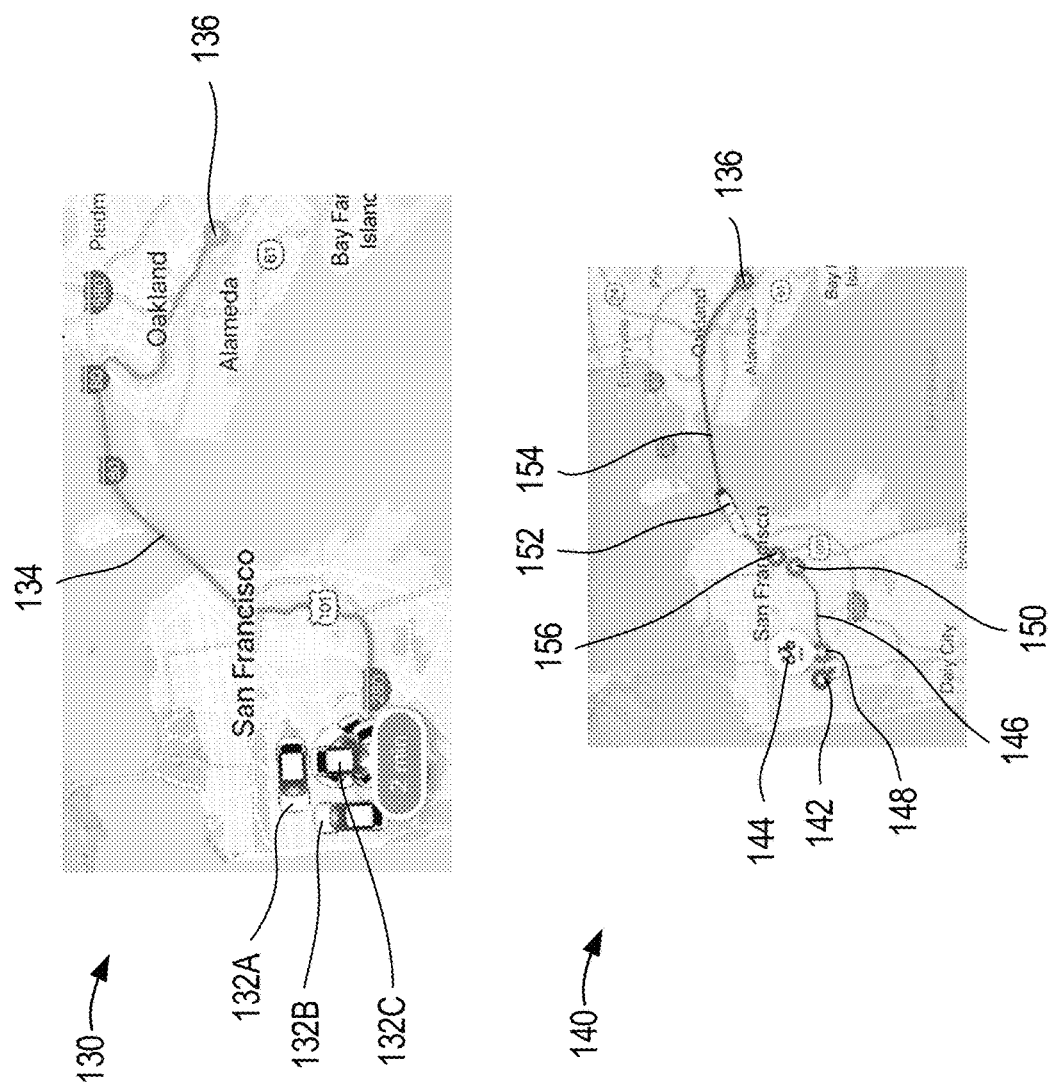
FIG. 1 illustrates routes according to exemplary embodiments of the present disclosure.

Existing systems for providing transportation are typically configured to identify and provide a particular modality of transportation between starting and ending locations. For example, FIG. 1 depicts a route 130 identifying a particular modality of transportation between a starting location (not labelled) and an ending location 136. The route 130 includes a single route segment 134 between the starting location and the ending location 136. The route segment 134, as generated, is to be serviced by one of the cars 132A-C. For example, a user requesting transportation from the starting location to the ending location 136 may be picked up by one of the cars 132A-C and driven along the route indicated by the route segment 134 to the ending location 136.

In certain implementations, systems may analyze and/or recommend routes using modalities other than cars. For example, where the starting location and ending location 136 are closer together (e.g., shorter rides), the transportation matching system may generate routes that utilize a personal mobility vehicle (e.g., a bicycle or a scooter). As another example, a system may determine that a given starting location and/or ending location 136 are near transit stops for public transportation systems. In such a scenario, the transportation matching system may generate a route from the starting location that utilizes a public transportation modality (e.g., a bus or a train).

Typical systems for providing transportation, however, may not be able to generate routes that combine multiple modalities into a single transportation proposal. Therefore, such transportation matching systems cannot capture cost or time savings associated with combining multiple modalities into a single transportation proposal. For example, in certain instances (e.g., during rush hour traffic), car-based modalities may be comparatively slower than other modalities, such as bicycles or scooters. As another example, during rush hour or periods of high road congestion, it may be faster to take the train (i.e., use a public transit modality) between the two locations rather than to drive (i.e., use an automobile modality) between the two locations. In such instances, existing systems may recommend public transportation modalities between starting and ending locations for users located near transit stops. But such a recommendation may not be useful for all users. For instance, users that are not in close proximity to a transit stop may have to walk long distances over a significant amount of time to access the transit stop from their starting location. Alternatively, such users may have to walk long distances over a significant amount of time to leave a transit stop and arrive at their ending location. In either scenario, using public transportation may be slower than traveling by car. Such users may therefore be recommended routes using cars, such as the cars 132A-C.

Nevertheless, even users located far away from public transportation may receive faster transportation if they were able to use other modalities for transportation to the transit stops. For example, FIG. 1 also depicts a route 140 for transportation between a starting location 142, which corresponds to the starting location of the route 130, and an ending location 136. Rather than fulfilling the entire route 140 with a single modality as in the route 130, the route 140 includes two route segments 146, 154 fulfilled by two different modalities (e.g., two different types of vehicles 144, 152). In particular, route segment 146 is fulfilled by bicycle 144 and route segment 154 is fulfilled by train 152. While following the route 140, a user may walk from starting location 142 to location 148 at the beginning of the route segment 146 and pick up a bicycle 144 (e.g., a docked or dockless bicycle available for short term rental and/or use). The user can then ride the bicycle 144 from the location 148 to the location 150 at the end of the route segment 146 and drop off the bicycle 144 (e.g., at a bicycle dock or bicycle rack) before walking to location 156 at the start of segment 154. The location 156 may correspond to a transit station (e.g., a train station), and the user may board the train 152 for transportation to the ending location 136 at the end of the segment 154.

By generating routes with multiple modalities, the transportation matching system may combine the benefits of each type of modality. For example, bicycles, scooters, and/or walking may be optimal for traveling short or medium distances (e.g., first-mile and last-mile legs of multi-modal transportation proposals), while automobiles and trains may be better for longer distances. Similarly, automobiles may be more flexible in scheduling and routing, but may be more expensive, while trains and buses may be less flexible but also less expensive. By combining any one of these modalities into a single transportation proposal, routes such as the route 140 may capitalize on the relative benefits of each type of modality. For example, during rush hour or periods of high road congestion, the route 140 may be able to allow more users to quickly and conveniently access faster and less expensive transportation via trains 152 (in comparison to automobiles). In another example, transportation by automobile may be faster and easier if disparate passengers meet at a common pick-up location, or if new passengers travel to pick-up locations closer to an existing route for an operator. In such instances, transportation proposals can be generated that identify routes that guide users to use personal mobility vehicles for transportation to such pick-up locations.

Therefore, there exists a need to generate routes that utilize different modalities. To generate multi-modal routes, existing systems may utilize networks based on locations associated with certain modalities. For example, such systems may use multi-label correcting (MLC) processes and/or multi-modal multicriteria RAPTOR (MCR) processes that rely on networks of locations associated with trains and buses to generate routes that combine different modalities. Specifically, such techniques may be used to generate routes that combine walking, trains and buses to travel from an origin location to a destination location. Such processes rely on accurate networks of locations associated with the modalities. These networks may include segments of routes that connect the locations and routes may be assembled based on these segments. However, because the networks need to include accurate locations, processes that rely on networks typically work only with modalities with locations that do not change frequently. For example, the locations of bus stops and train stations rarely change, so networks can be generated based on these locations and used to generate routes in the future. Generating the network can be computationally expensive, as the number of route segments in a network increases exponentially with the number of locations within the network. The locations of available vehicles and/or docks for certain modalities, such as docked rideable vehicles (e.g., bicycles, scooters) or dockless rideable vehicles, may change regularly. For example, the number of docked rideable vehicles or spaces for depositing vehicles at various dock locations may change as users access and utilize vehicles for transportation. Similarly, the locations of dockless rideable vehicles may change as users utilize and relocate the vehicles. Therefore, locations of such vehicles cannot typically be added to the networks utilized by the MLC and MCR processes. Accordingly, these processes typically cannot utilize such modalities when generating a route. Thus, there exists a need to process the locations of rideable vehicles for network-based route-generating processes, such as MLC and MCR.

One solution to this problem is to create subnetworks of route segments between locations associated with the rideable modalities. For example, different types of subnetworks may be created for docked rideable vehicles and dockless rideable vehicles. In particular, subnetworks for docked rideable vehicles may be generated to include route segments connecting locations of docks at which the docked rideable vehicles can be accessed and/or deposited. Further, subnetworks for dockless rideable vehicles may include route segments that connect locations of the dockless rideable vehicles to locations associated with other modalities (e.g., train stations and/or bus stops). When conditions for the rideable vehicles change, the associated subnetwork can be updated. For example, when a dock reaches a full status or empty status, route segments originating from and/or terminating at the location of the dock may be removed from the subnetwork for docked rideable vehicles. As another example, when a dockless rideable vehicle becomes available or unavailable, route segments originating at the location of the vehicle may be generated and added to the subnetwork or removed from the network. In this way, subnetworks can be kept up-to-date such that network-based route generation processes can be used to generate routes that combine rideable modalities (e.g., docked and/or dockless rideable vehicles) with other types of modalities (e.g., buses, trains, automobiles, ferries).

Figure 2:
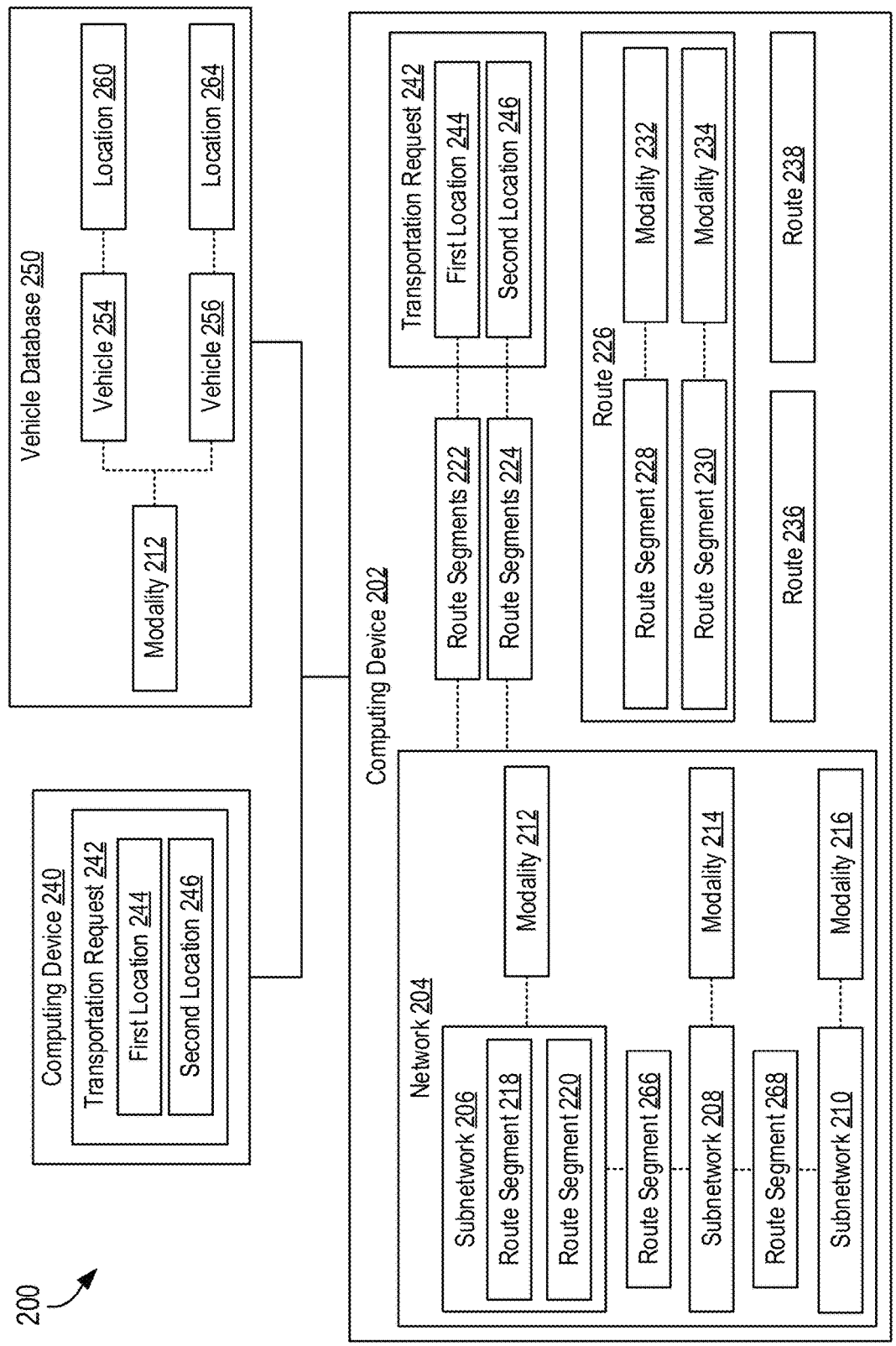
FIG. 2 illustrates a system for generating multi-modal routes according to an exemplary embodiment of the present disclosure.

FIG. 2 illustrates a system 200 according to an exemplary embodiment of the present disclosure. The system 200 includes a computing device 202, a computing device 240, and a vehicle database 250. The computing device 202 may be configured to generate routes 226, 236, 238 in response to transportation requests. For example, the computing device 202 may receive transportation request 242 from computing devices 240 requesting transportation from a first location 244 to a second location 246 (e.g., in connection with implementing a transportation network and/or transportation matching system). In response to receiving the transportation request 242, the computing device 202 may generate routes 226, 236, 238 for transportation from the first location 244 to the second location 246. The routes 226, 236, 238 may include one or more route segments 228, 230, and the route segments 228, 230 may be associated with different modalities 232, 234. For example, the modalities 232, 234 may include one or more of transportation by walking, transportation by bicycle, transportation by scooter, transportation by bus, transportation by train, transportation by automobile, and transportation by ferry. Certain types of vehicles may be considered rideable (e.g., "rideable vehicles"), such as bicycles, scooters, skateboards, rollerblades, and the like (e.g., Onewheel® vehicles). Rideable vehicles may be manually powered by the user, electrically powered by electrical motors, and/or electrically assisted by electrical motors. Rideable vehicles may also be docked and/or dockless. For example, rideable vehicles may be docked vehicles that need to be accessed and deposited at docks in fixed locations. As another example, rideable vehicles may be dockless vehicles that can be accessed from many different locations (e.g., where deposited by a previous user) and/or may be deposited wherever the vehicles can be securely locked. As a specific example, the route segment 228 may be serviced by a dockless scooter and the route segment 230 may be serviced by a train. Although not depicted, it should be understood that the routes 236, 238 may similarly include one or more route segments associated with one or more modalities.

To generate the routes 226, 236, 238, the computing device 202 may utilize a network 204. The network 204 may include information on locations associated with multiple modalities 212, 214, 216. In particular, the network 204 may include one or more subnetworks 206, 208, 210. Each subnetwork 206, 208, 210 may correspond to a particular modality 212, 214, 216, as depicted. The subnetwork 206 includes route segments 218, 220. As explained further below, the route segments 218, 220 may be generated to connect locations associated with the modality 212, 214, 216 to which the subnetwork 206, 208, 210 corresponds (e.g., locations of docks, locations of dockless vehicles, locations of bus stops, locations of train stations). Although not depicted, the subnetworks 208, 210 may similarly include route segments. Additionally, in practice, the subnetworks 206, 208, 210 may include many more route segments than depicted. For example, the subnetworks 206, 208, 210 may include hundreds of route segments, thousands of route segments, or more.

The subnetworks 206, 208, 210 may be connected with one or more additional route segments 266, 268. The route segments 266, 268 may be generated to connect between locations associated with different modalities 212, 214, 216. For example, the route segment 266 may be generated to connect locations associated with the modality 212 to locations associated with modality 214 and the route segment 268 may be generated to connect locations associated with the modality 214 to locations associated with the modality 216. In certain instances, the route segments 266, 268 that connect the subnetworks 206, 208, 210 may be generated as walking segments to walk between the locations associated with the different modalities 212, 214, 216. For example, where the modality 212 is transportation by docked scooter and the modality 214 is transportation by train, the route segments 266 may be generated as walking segments between dock locations and train station locations. The route segments 266, 268 may enable the network 204 to connect between multiple types of modalities while generating routes without having to generate route segments that transition between modalities for each route generated using the network 204. It should be understood that, in practice, the network 204 may include many types of route segments 266, 268 between subnetworks 206, 208, 210. In particular, certain implementations of the network 204 may include route segments 266, 268 connecting every pair of subnetworks 206, 208, 210. As a specific example, although not depicted, the network 204 may include route segments connecting the subnetwork 206 to the subnetwork 210. Furthermore, and as explained further below, as conditions change for certain types of modalities (e.g., rideable modalities), one or more subnetworks 206, 208, 210 may be updated. Additionally, as a result of updating the subnetworks 206, 208, 210, one or more of the route segments 266, 268 connecting an updated subnetwork to other subnetworks may similarly need to be updated.

The computing device 202 may also generate route segments 222, 224 connecting between the first location 244 and the second location 246 and the transportation request 242. The route segments 222, 224 may be generated similar to the route segments 266, 268. For example, the route segments 222, 224 may be generated to connect the first location 244 and the second location 246 to locations included within the subnetworks 206, 208, 210. For example, the route segments 222 may be generated as walking segments between the first location 244 and locations associated with at least one of the modalities 212, 214, 216. As another example, the route segments 224 may be generated as walking segments from the second location 246 to locations associated with at least one of the modalities 212, 214, 216. In certain implementations, the route segments 222, 224 may be generated between the first and second locations 244, 246 and locations from the network 204 that are within a predetermined distance of the first and second locations 244, 246.

To generate the routes 226, 236, 238, the computing device 202 may identify one or more combinations of route segments 218, 220, 222, 224, 266, 268 that connect the first location 244 to the second location 246. For example, the computing device 202 may utilize one or more network-based route generation techniques, such as the MLC and/or MCR route-generation processes to determine routes that connect the first location 244 to the second location 246 within the network 204. In particular, the computing device 202 may generate routes that connect locations within the network 204 associated with the route segments 222 to locations within the network 204 associated with the route segments 224. In certain implementations, the network 204 may be configured to determine all such routes within the network 204 that connect the first location 244 to the second location 246. In additional or alternative implementations, as explained further below, the computing device 202 may exclude certain types of routes and/or route segments 218, 220 within the network 204 from generated routes.

The vehicle database 250 stores information that may be used to generate and/or update the network 204. For example, the vehicle database 250 stores information regarding vehicles 254, 256 and associated locations 260, 264. In particular, the vehicle database 250 stores identifiers of vehicles 254, 256 in association with a modality 212 identifying the type of transportation provided by the vehicles 254, 256. The vehicle database 250 may also store locations 260, 264 for vehicles 254, 256. The locations 260, 264 may identify current locations associated with the vehicles 254, 256. For example, where the modality 212 is transportation by automobile, the locations 260, 264 may indicate a current location of the vehicles 254, 256 (e.g., the automobiles). In another example, where the modality 212 is transportation by bicycles (e.g., docked and/or dockless bicycles), the locations 260, 264 may indicate a current location of the vehicles 254, 256 (e.g., the bicycles). In particular, for docked bicycles the locations 260, 264 may indicate the locations of stations with docks containing bicycles that are available for rental and/or spaces available to deposit a bicycle. Further, for dockless bicycles, the location 260, 264 may indicate the locations of bicycles that are available for use (e.g., locations at which previous users of the dockless bicycles left the bicycles). The locations 260, 264 may also identify locations from which a user may access the vehicles 254, 256. For example, where the modality 212 is transportation by train, the locations 260, 264 may identify one or more train stations from which a user can board the trains. As another example, where the modality 212 is transportation by bus, the locations 260, 264 may identify one or more bus stops from which a user can board the buses. As a still further example, where the modality 212 is transportation by automobile and the automobile is operated autonomously, users may be required to be picked up and/or dropped off at predetermined locations. In such instances, the locations 260, 264 may identify eligible pick-up and/or drop-off locations. In certain implementations, the locations 260, 264 may be received from location sensors associated with the vehicles 254, 256. For example, the locations 260, 264 may be determined by a GPS sensor affixed to the vehicle 254, 256 and/or by a GPS sensor within a mobile device of a user that is utilizing the vehicle 254, 256 (e.g., is currently riding in the vehicle). Although the vehicle database 250 is depicted as storing information regarding a single modality 212, it should be understood that, in practice, information may be stored about multiple modalities 212, 214, 216. For example, the vehicle database 250 may store information about more than one modality 212, 214, 216. As another example, separate databases may be used that store information about the modalities 212, 214, 216. As a specific example, a first database may store information regarding the modality 212 (e.g., rideable vehicles), a second database may store information regarding the modality 214 (e.g., buses), and a third database may store information regarding the modality 216 (e.g., trains).

One or more of the computing devices 202, 240 and the vehicle database 250 may be implemented by a computer system. For example, although not depicted, one or more of the computing devices 202, 240 and the vehicle database 250 may include a processor and a memory that implement at least one operational feature. For example, the memory may contain instructions which, when executed by the processor, cause the processor to implement at least one operational feature of the computing devices 202, 240 and the vehicle database 250. Further, in certain instances, the computing devices 202, 240 may be implemented by different types of computing devices. For example, in certain implementations, the computing device 202 may be implemented as one or more servers and the computing device 240 may be implemented as a mobile device and/or other personal computing device associated with a user.

Figure 3A:
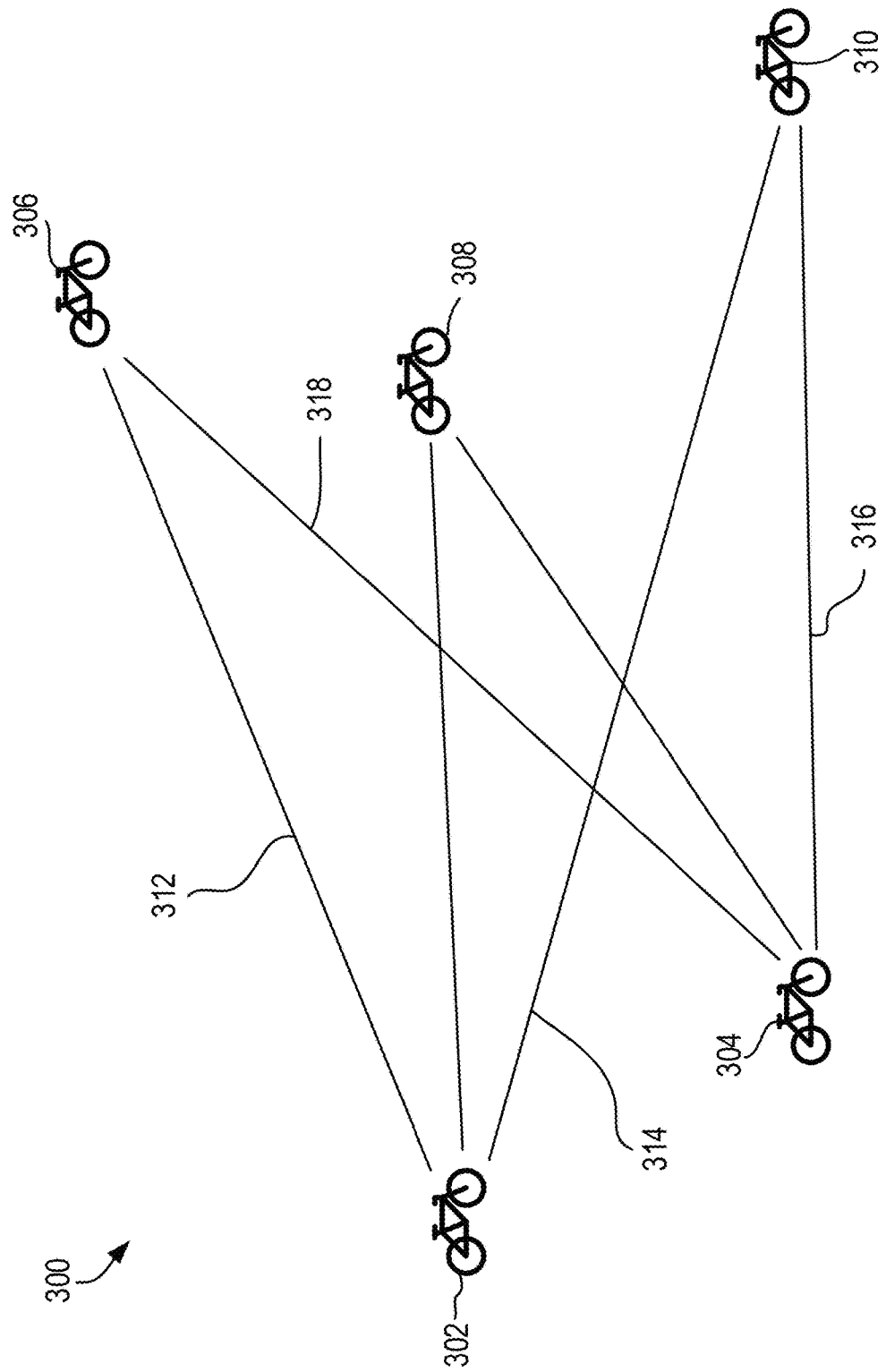
FIGS. 3A-3C illustrate subnetworks for use in generating multi-modal routes according to exemplary embodiments of the present disclosure.
Figure 3B:
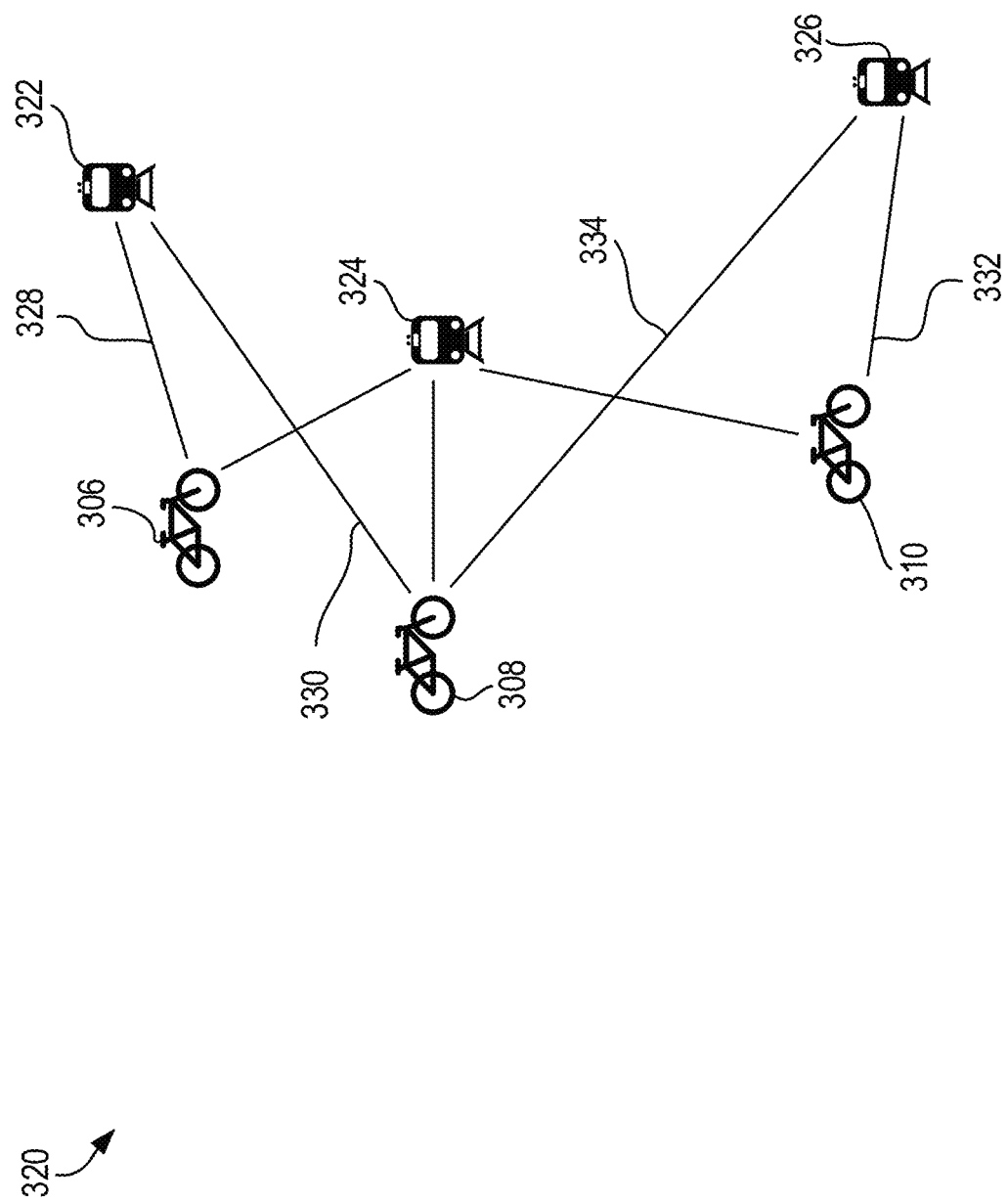
Figure 3C:
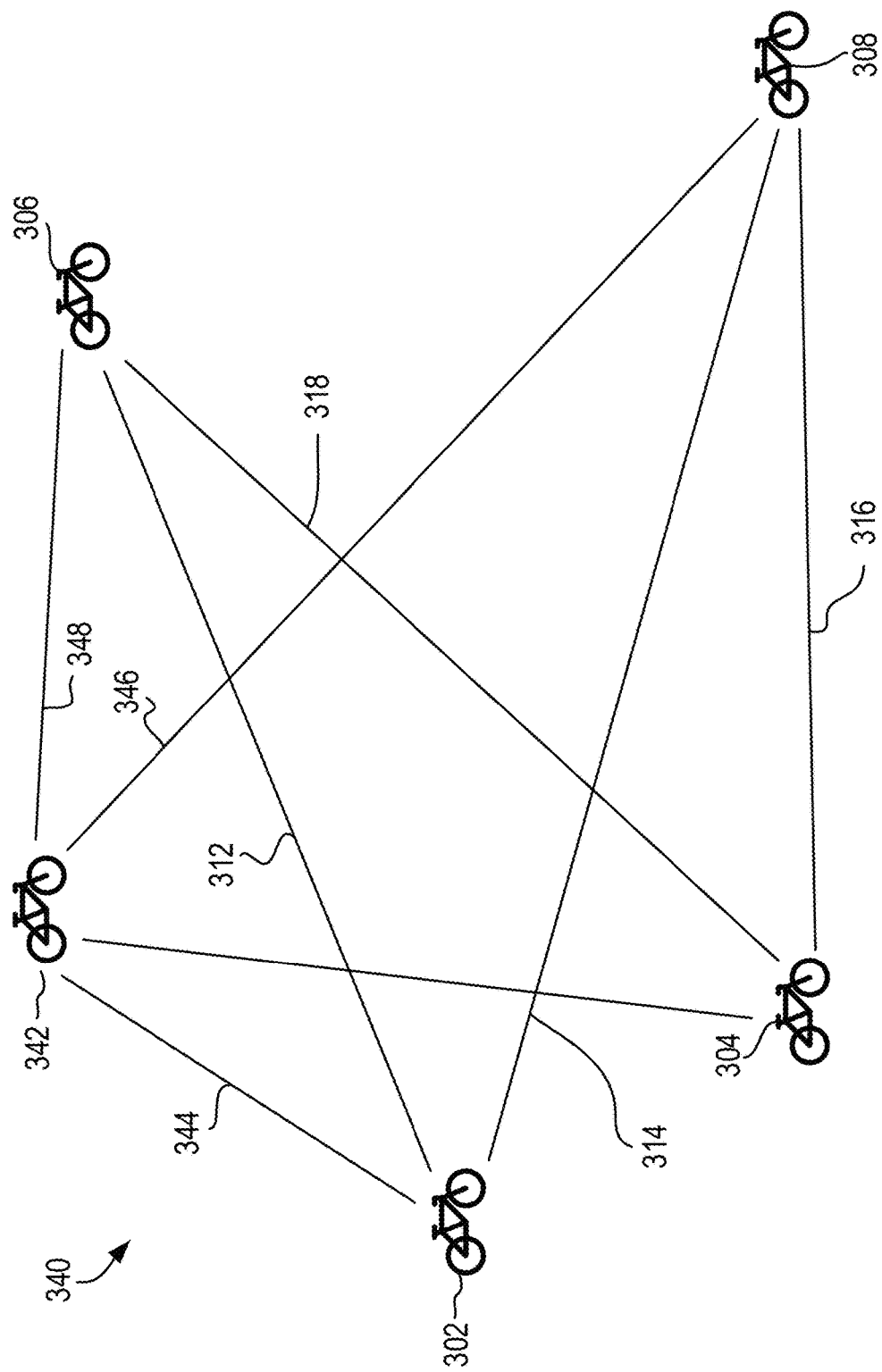

FIGS. 3A-3C illustrate subnetworks 300, 320, 340 for use in generating multi-modal routes according to exemplary embodiments of the present disclosure. For example, the subnetworks 300, 320, 340 may be exemplary implementations of the subnetworks 206, 208, 210. As depicted, the subnetworks 300, 320, 340 are associated with a modality of transportation by bicycle. In particular, the subnetworks 300, 320, 340 may be associated with transportation by docked bicycle.

Turning to FIG. 3A, the subnetwork 300 includes locations 302, 304, 306, 308, 310. The locations 302, 304, 306, 308, 310 may be associated with locations of docks. For example, the locations 302, 304, 306, 308, 310 may be associated with the locations of docks from which bicycles can be accessed and/or docks at which bicycles can be deposited. The subnetworks 300 also includes route segments 312, 314, 316, 318 between the locations 302, 304, 306, 308, 310. For clarity, only a subset of the route segments 312, 314, 316, 318 within the subnetworks 300 are identified by reference numbers. To generate the subnetworks 300, route segments 312, 314, 316, 318 may be generated between each of the locations 302, 304, 306, 308, 310 within the subnetwork 300. In certain implementations, route segments may be generated to connect all locations within the subnetworks 300. For example, in practice, the subnetwork 300 may include many locations (e.g., hundreds of locations) of docks within a particular area (e.g., within a city and/or neighborhood). In such instances, route segments may be generated to connect each pair of locations within the subnetwork 300. Additionally or alternatively, route segments may be generated to connect pairs of locations located within a predetermined distance of one another.

For example, the predetermined distance may differ based on modality. As a specific example, the predetermined distance for bicycles (e.g., 3 miles, 5 miles, 10 miles) may be larger than the predetermined distance for scooters (e.g., 1 mile, 2 miles, 5 miles) and may be smaller than the predetermined distance for electrically-assisted bicycles (e.g., 5 miles, 10 miles, 15 miles), although other implementations are possible. In still further implementations, the route segments 312, 314, 316, 318 may be generated based on a range of vehicles (e.g., a range based on a battery charge level of vehicles located at particular docks). For example, longer route segments may be generated for vehicles with higher battery charge levels and shorter route segments may be generated for vehicles with lower battery charge levels. The generated route segments 312, 314, 316, 318 may then be combined to form the subnetwork 300. Once generated, the subnetwork 300 may be used in combination with other subnetworks to form a network 204 used to generate routes to 26, 236, 238.

As explained further above, to generate the network 204, route segments may be generated to connect subnetworks associated with different modalities. In particular, route segments may be generated to connect locations within one subnetwork to locations within another subnetwork. Turning to FIG. 3B, the subnetwork 320 includes route segments 328, 330, 332, 334 (only a subset of which are numbered for clarity) that connect locations 306, 308, 310 associated with the subnetwork 300 to locations 322, 324, 326 associated with a different subnetwork. In particular, the locations 322, 324, 326 are associated with a subnetwork for transportation by train. In particular, the locations 322, 324, 326 may be associated with stations at which trains may be accessed. As explained above, the route segments 328, 330, 332, 334 may be generated as walking segments (e.g., segments a user can follow while walking) between the locations 306, 308, 310 and the locations 322, 324, 326. Accordingly, the route segments 328, 330, 332, 334 may be generated to comply with one or more requirements. For example, the route segments 328, 330, 332, 334 may be generated to not exceed a particular distance requirement (e.g., 0.25 miles, 0.5 miles, 1 mile) and/or a particular travel time requirement (e.g., five minutes, 10 minutes, 15 minutes). In particular, the route segments 328, 330, 332, 334 may be generated for pairs of locations within a network 204 that are located within a predetermined threshold distance (e.g., 0.25 miles, 0.5 miles, 1 mile) of one another. Such techniques may similarly be used to generate route segments connecting more than two subnetworks. For example, a network may additionally include locations associated with other modalities (e.g., transportation by scooter, transportation by bus) and route segments connecting the locations 306, 308, 310, 322, 324, 326 two nearby locations associated with the other modalities may be generated using similar techniques. Further, although not depicted, it should be understood that route segments between other locations within the subnetwork 300 (e.g., the locations 302, 304) and locations associated with other subnetworks may be generated using similar techniques.

In certain instances, conditions within the subnetwork 300 may change. For instance, the location and/or availability of rideable vehicles may change as users utilize the vehicle for transportation, relocating the vehicle in the process. For example, for docked rideable vehicles (e.g., bicycles and/or scooters), the number of available vehicles and/or available spots for depositing vehicles in particular docks may change as users access, ride, and relocate the vehicles. In particular, over time, certain docks may empty and may accordingly have no vehicles available for use. In alternative instances, certain docks may fill up and may accordingly have no spaces available for depositing vehicles. As another example, for dockless rideable vehicles, the locations of available vehicles may change. In particular, vehicles that were previously available may become unavailable when a user accesses (e.g., unlocks) the vehicles. Additionally or alternatively, new vehicles may become available when a user deposits (e.g., secures) the vehicles. As explained above, network-based route generation processes require the networks to accurately represent the locations of vehicles utilized in generated routes. Accordingly, subnetworks associated with rideable vehicles need to be updated to account for these changes in the locations and/or availabilities of vehicles and docks.

Turning to FIG. 3C, the subnetwork 340 may be an updated version of the subnetwork 300. In particular, the subnetwork 300 does not include the location 308 and includes a new location 342. The location 308 may be removed because the dock located at location 308 is full. For example, the route segments in the subnetwork 300 terminating at the location 308 may represent segments that begin at locations 302, 304 and terminate at the location 308. Because the dock located at location 308 is full, additional vehicles may not be deposited at the dock. Accordingly, the location 308 and the associated route segments may be removed from the subnetwork 300 to generate the updated subnetwork 340. The new location 342 may represent a previously empty dock that now has bicycles available for use (e.g., after a user utilizing a bicycle deposits the bicycle at the dock located at the location 342). In particular, the subnetwork 340 includes additional route segments 344, 346, 348 (only a subset of which are numbered), which may begin at the location 342 and may terminate at other locations 302, 304, 308, 306. These routes may be newly-possible because of the vehicles now available at the location 342 and may accordingly be added to the updated subnetwork 340.

Subnetworks 300 corresponding to docked rideable vehicles may be updated using techniques similar to those discussed above in connection with the subnetwork 340 according to one or more changed conditions. For example, updated subnetworks 340 may be generated whenever a dock within the subnetwork changes availability status. In particular, updated subnetworks 340 may be generated when a dock becomes either full of vehicles or empty of vehicles. For instance, updated subnetworks 340 may be generated to remove route segments terminating at docks that are full and to remove route segments beginning at docks that are empty. In FIG. 3C, the location 308 and associated route segments are completely removed for clarity. In practice, it should be understood that only particular types of routes associated with location 308 may be removed. For example, only routes terminating at the location 308 may be removed upon determining that the dock located at location 308 is full. Also, for clarity, the location 342 was not included in the subnetwork 300. However, it should be understood that, in practice, because the dock located at the location 342 was previously empty, route segments terminating at the location 342 may be included within the subnetwork 300. Furthermore, in certain instances, the subnetwork 300 may stay in use while an updated subnetwork 340 is generated. For example, after detecting a changed condition (e.g., a change in status for a dock), the updated subnetwork 340 may be generated while the subnetwork 300 remains in use by the computing device 202. Once the updated subnetwork 340 is generated, the subnetwork 300 may be replaced with the updated subnetwork 340 and a copy of the updated subnetwork 340 may be stored for use in future updates.

In certain implementations, for docked rideable vehicles, the particular route segments between locations 302, 304, 306, 308, 310, 342 may be precomputed and stored for future use in generating and/or updating subnetworks 300, 320, 340. For example, the route segments may be generated as dock locations are added and/or removed to a corresponding transportation infrastructure. Accordingly, rather than regenerating the route segments whenever the subnetwork needs to be updated, the route segments may be stored in association with an indicator of whether the route segments are available for generated routes. In such instances, when a route segment is removed from the subnetwork, the associated indicator may be updated to indicate that the route segment is not available for routes. Similarly, when a route segment is added to an updated subnetwork, the associated indicator may be updated to indicate that the route segment is available for routes. In this way, subnetworks may be more responsively updated because the route segments do not need to be regenerated every time the status of docks within the subnetwork changes. Rather, by updating the associated indicators instead, computational resources may be preserved, reducing latency and increasing the responsiveness of updates to the subnetworks. Additionally, route segments between locations associated with docked rideable vehicles may typically be generated as bidirectional routes (e.g., routes that can be traveled in either direction between routes). In such instances, route segments added to or removed from updated subnetworks may be route segments that correspond to a particular direction of travel between the docks. For example, if a first dock changes to a full status (e.g., no available spaces), a route segment beginning at a second dock and ending at the first dock may be removed, while a route segment beginning at the first dock and ending at the second dock may remain in the updated subnetwork. In other implementations, route segments for docked vehicles may be generated again each time the subnetwork is updated. For example, route segments may be computed and/or updated to take into account changes in availability of vehicles and/or spaces at docks within the subnetwork.

When route segments are precomputed, one or more route segments may be removed from the subnetwork. For example, route segments may be removed that do not comply with one or more requirements including a maximum travel time requirement, a minimum travel time requirement, a maximum cost requirement, a minimum cost requirement, a maximum distance requirement, a minimum distance requirement, a maximum vertical gain requirement, and/or a minimum vertical gain requirement. Removing route segments in this manner may reduce the number of overall route generation options within a network that ultimately correspond to undesirable routes (e.g., unnecessarily short segments, unnecessarily long segments, difficult segments to travel by rideable vehicle). Accordingly, the overall quality of the generated routes may be improved while also reducing the computing resources necessary to generate the routes.

Figure 4A:
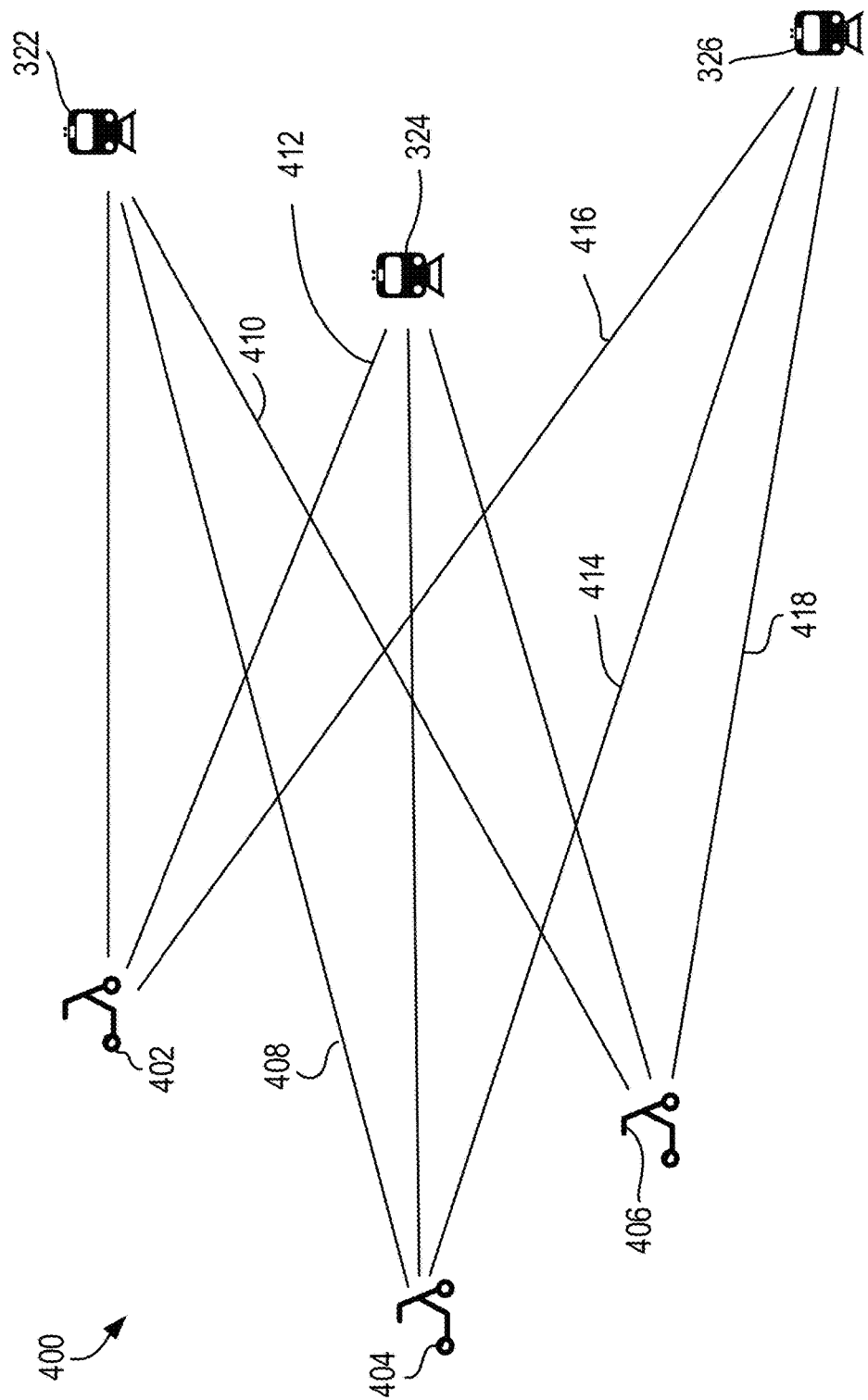
FIGS. 4A-4B illustrate subnetworks for use in generating multi-modal routes according to exemplary embodiments of the present disclosure.
Figure 4B:
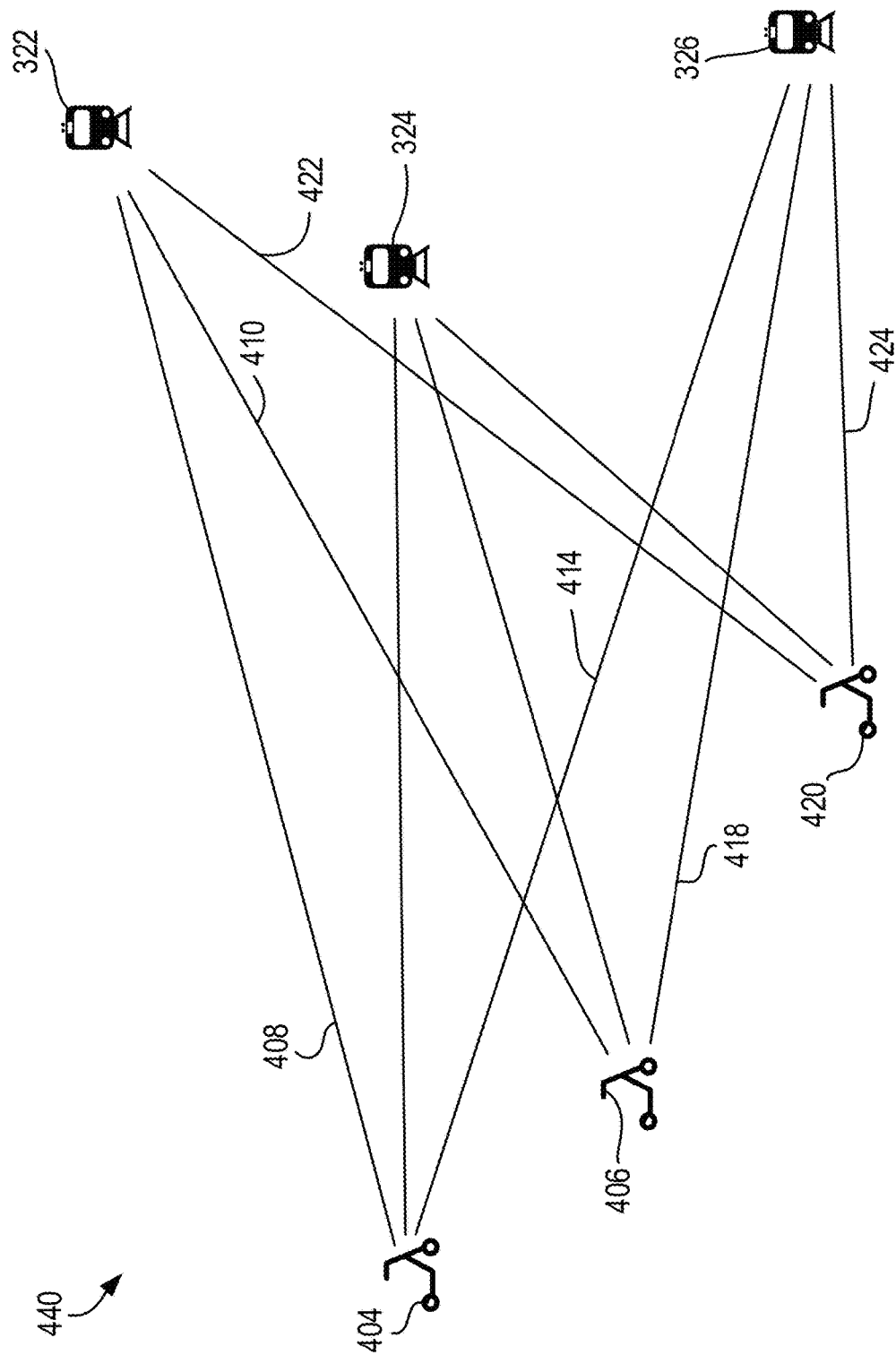

FIGS. 4A-4B illustrate subnetworks 400, 440 for use in generating multi-modal routes according to exemplary embodiments of the present disclosure. Similar to the subnetwork 300, the subnetwork 400 includes locations 402, 404, 406 associated with a modality. For example, the locations 402, 404, 406 may be associated with dockless scooters. The subnetwork 400 also includes the locations 322, 324, 326 associated with trains. The subnetwork 400 further includes route segments 408, 410, 412, 414, 416, 418 (only a subset of which are numbered for clarity). For dockless rideable vehicles, such as dockless scooters, route segments 408, 410, 412, 414, 416, 418 may begin at the locations 402, 404, 406 of the dockless rideable vehicles and may terminate at locations 322, 324, 326 associated with other modalities. In particular, because dockless rideable vehicles do not need to be deposited at docks, the route segments 408, 410, 412, 414, 416, 418 may proceed directly to the locations 322, 324, 326. Similar to the route segments of the subnetworks 300, 320, 340, the route segments 408, 410, 412, 414, 416, 418 may be generated to comply with one or more requirements (e.g., cost, distance, travel time, and/or vertical gain requirements). However, unlike the route segments associated with the subnetworks 300, 320, 340, the route segments 408, 410, 412, 414, 416, 418 for the dockless rideable vehicles may typically not be bidirectional. Additionally, because the route segments 408, 410, 412, 414, 416, 418 may be generated to terminate at locations associated with other modalities, supplementary segments, such as those generated with the subnetwork 320 may not be necessary. In certain instances, route segments for dockless vehicles may be generated to begin or terminate at locations associated with docks (e.g., the locations 302, 304, 306, 308, 310, 342). For example, electrically-powered dockless vehicles and/or electrically-assisted dockless vehicles may be charged at docks. Accordingly, route segments may be generated to terminate at docks (e.g., for dockless vehicles with a low charge level or with a low predicted future charge level). Similarly, route segments may be generated that begin at docks (e.g., for dockless vehicles that have been charged at a dock). In instances where route segments begin or end at docks, supplementary route segments may be generated as discussed above with subnetwork 320. Furthermore, route segments may be generated based on a range of vehicles (e.g., a range based on a battery charge level of vehicles), as discussed further above.

Similar to the subnetwork 300, conditions within the subnetwork 400 may change over time. For example, dockless rideable vehicles may become unavailable when accessed by users and new dockless rideable vehicles may become available when deposited by users. Turning to FIG. 4B, an updated subnetwork 440 may be generated in such situations. In the subnetwork 440, the location 402 is removed from the subnetwork 400 and a new location 420 is added. For example, the vehicle located at the location 402 may have been accessed by a user and may therefore be unavailable for use and a vehicle at the location 420 may have been deposited by a user and is available for use. The location 402 may therefore be removed from the subnetwork 400 to generate the updated subnetwork 440 and the location 420 may be added. In removing the location 402, the route segments 416 beginning at the location 402 may also be removed from the subnetwork 400. When adding the location 420 to the network, new route segments 422, 424 (only a subset of which are numbered for clarity) may be generated that begin at the location 420. For example, new route segments 422, 424 may be generated from the new location 420 to locations of other modalities according to requirements similar to those used to initially generate the route segments 408, 410, 412, 414, 416, 418 of the subnetwork 400.

Updated subnetworks may be generated as the locations and availability of dockless rideable vehicles changes. For example, an updated subnetwork may be generated each time a vehicle becomes unavailable (e.g., is removed from the subnetwork) and/or each time a new vehicle becomes available (e.g., is added to the subnetwork). As a specific example, suppose the vehicle at location 402 became unavailable before the vehicle at location 420 became available. In such instances, the subnetwork may be updated twice: first to remove the location 402 and then to add the location 420.

As explained further above in connection with subnetworks 300, 320, 340 for docked rideable vehicles, route segments that do not comply with one or more restrictions (e.g., time, distance, and/or cost restrictions) may be removed from the subnetworks 400, 440. For example, certain generated route segments 410, 414, 416, 422 may exceed a distance requirement and may therefore be removed from the subnetworks 400, 440. Relatedly, unlike the route segments of the subnetworks 300, 320, 340, it may not be possible to generate the route segments for the subnetworks 400, 440 ahead of time. In particular, because the locations of available dockless vehicles can change constantly depending on where users deposit the vehicles, it may be necessary to regenerate route segments for the locations of newly-available vehicles. Accordingly, to reduce computational complexity and improve the responsiveness of the subnetwork updates, it may be necessary to constrain the route segments that are generated. In particular, to generate an updated subnetwork 440 for a new location 420, only route segments 422, 424 originating at the new location 420 may be generated and the remaining route segments 408, 410, 414, 418 of the subnetwork may remain the same. Updating the subnetwork 440 in this manner may ensure that the network is responsively updated while also reducing the computing resources necessary to do so.

Figure 5:
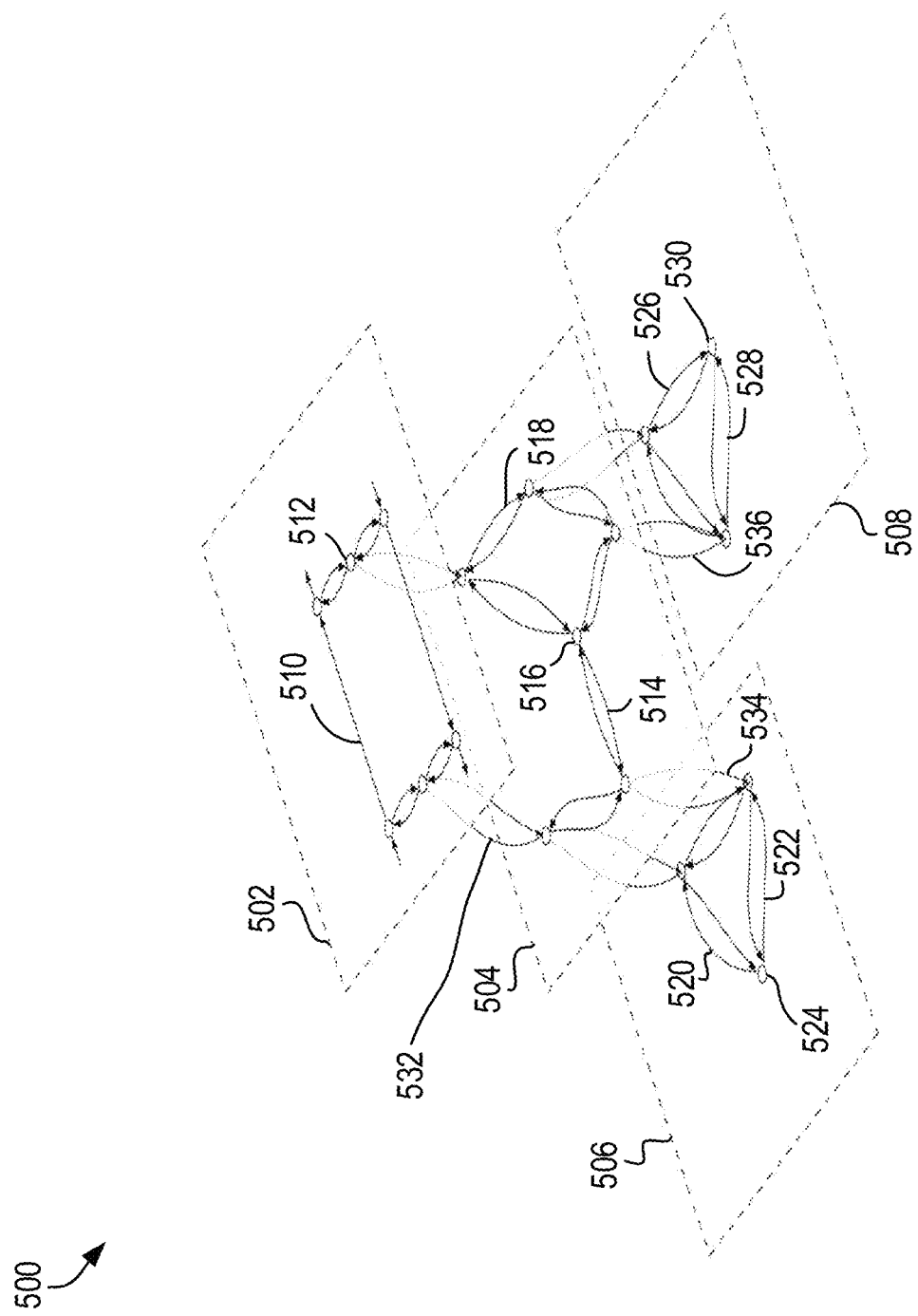
FIG. 5 illustrates a network for use in generating multi-modal routes according to an exemplary embodiment of the present disclosure.

FIG. 5 illustrates a network 500 for use in generating multi-modal routes according to an exemplary embodiment of the present disclosure. The network 500 may be an exemplary implementation of the network 204 used by the computing device 202 to generate routes 226, 236, 238. The network 500 includes subnetworks 502, 504, 506, 508, which may be associated with different modalities. For example, the subnetwork 502 may be associated with trains, the subnetwork 504 may be associated with buses, the subnetwork 506 may be associated with docked rideable vehicles (e.g., docked bicycles), and the subnetwork 508 may be associated with automobiles. Although not depicted, the network 500 may include additional or alternative subnetworks. For example, in certain implementations, one or more of the subnetworks 502, 504, 506, 508 may be omitted and/or additional subnetworks (e.g., subnetworks associated with dockless rideable vehicles) may be included within the network 500.

The subnetworks 502, 504, 506, 508 include locations 512, 516, 524, 530 and route segments 510, 514, 518, 520, 522, 526, 528 between the locations 512, 516, 524, 530. For clarity, only a subset of the locations 512, 516, 524, 530 and the route segments 510, 514, 518, 520, 522, 526, 528 are provided with reference numbers. The route segments 510, 514, 518, 520, 522, 526, 528 may be generated based on route segment constraints for the associated modalities. For example, the route segments 510 for the subnetwork 502 associated with trains may be generated to comply with train lines and train schedules between the locations 512 (e.g., between train stations). In certain instances, the route segments 510 may additionally include transfer segments (e.g., walking segments) between different train lines (e.g., different train lines at the same train station). As another example, the route segments 514, 518 for the subnetwork 504 associated with buses may be generated to comply with the bus routes and bus schedules between the locations 516.

As a further example, the route segments 520, 522 for the subnetwork 506 associated with docked rideable vehicles may be generated between the locations 524 using techniques similar to those discussed above in connection with the subnetworks 300, 320, 340. As yet another example, the route segments 526, 528 for the subnetwork 508 associated with automobiles may be generated between the locations 530 based on route segment restrictions associated with automobiles (e.g., distance, time, and/or costs restrictions).

The network 500 also includes route segments 532, 534, 536 that connect the subnetworks 502, 504, 506, 508 (only a subset of which are numbered for clarity). For example, the route segments 532 connect the subnetwork 502 to the subnetwork 504, the route segments 534 connect the subnetwork 504 to the subnetwork 506, and the route segments 536 connect the subnetwork 504 to the subnetwork 508. The route segments 532, 534, 536 between the subnetwork 502, 504, 506, 508 may be generated as walking segments connecting locations within the subnetwork 502, 504, 506, 508. For example, the route segments 532, 534, 536 may be generated using techniques similar to those discussed above in connection with the route segments 266, 268, 328, 330, 332, 334. Additionally, although not depicted, further implementations may include route segments generated to connect other combinations of the subnetwork 502, 504, 506, 508. For example, in certain implementations, the network 500 may additionally or alternatively include route segments connecting the subnetwork 502 to the subnetwork 506 and/or connecting the subnetwork 502 to the subnetwork 508.

Figure 6:
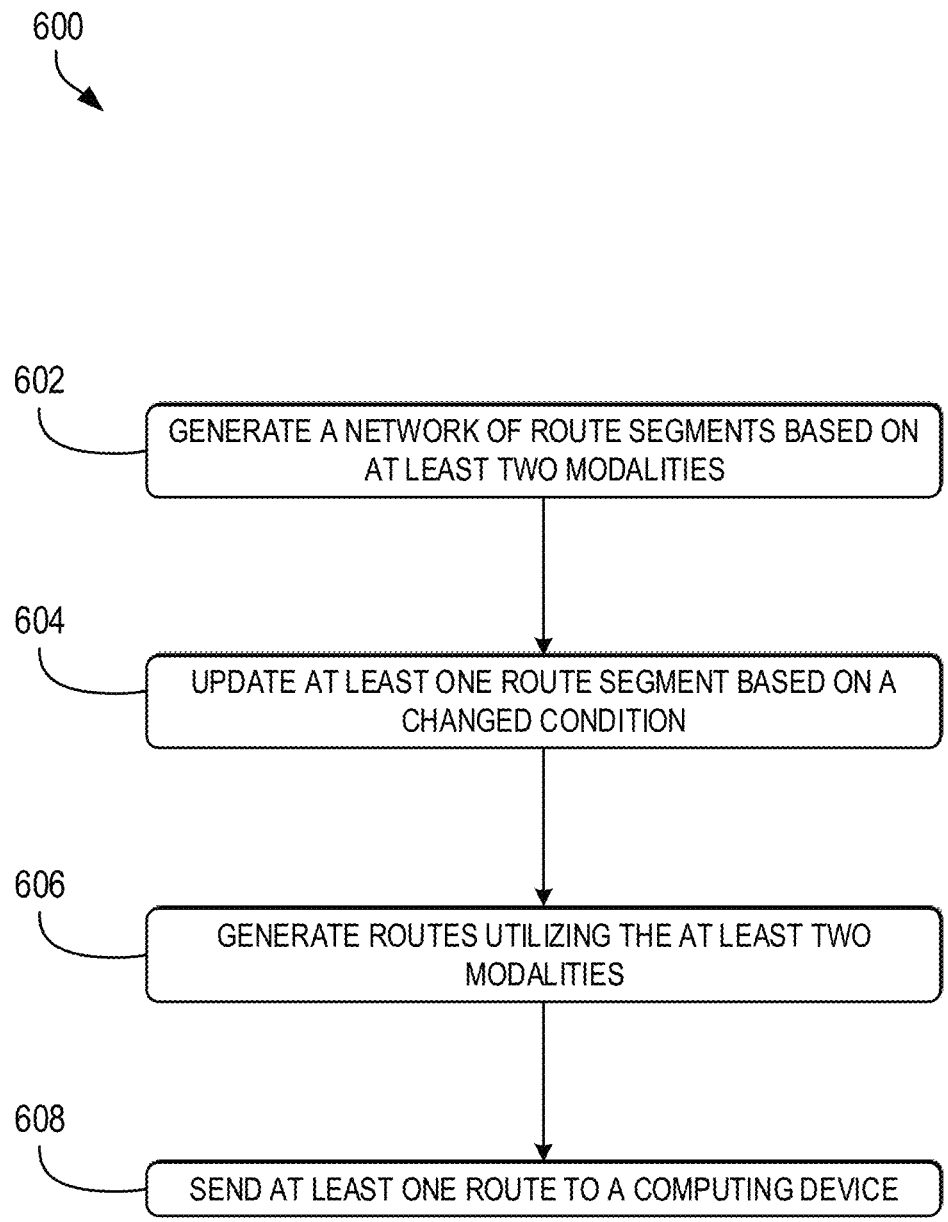
FIG. 6 illustrates a method for generating multi-modal routes according to an exemplary embodiment of the present disclosure.

FIG. 6 illustrates a method 600 according to an exemplary embodiment of the present disclosure. The method 600 may be performed to generate routes 226, 236, 238 that include route segments 228, 230 associated with different modalities 232, 234 (as illustrated in FIG. 2). The method 600 may be implemented on a computer system such as the system 200. For example, the method 600 may be implemented by the computing device 202, the computing device 240, and/or the vehicle database 250. The method 600 may also be implemented by a set of instructions stored on a computer readable medium that, when executed by a processor, cause the processor to perform at least a portion of the method 600. For example, all or part of the method 600 may be implemented by a processor and a memory of the computing device 202, the computing device 240, and/or the vehicle database 250. Although the examples below are discussed with reference to the flowchart illustrated in FIG. 6, many other methods of performing the acts associated with FIG. 6 may be used. For example, the order of some of the blocks may be changed, certain blocks may be combined with other blocks, one or more of the blocks may be repeated, and some of the blocks described may be optional.

The method 600 may begin with generating a network 204 of route segments 218, 220, 266, 268 based on at least two modalities 212, 214, 216 (block 602). For example, the computing device 202 may generate the network 204 based on locations associated with the different modalities 212, 214, 216. As a specific example, the computing device 202 may receive locations associated with vehicles of the at least two modalities from a vehicle database 250. As explained above, the specific types of locations received for each of the modalities may differ depending on the type of modality. For example, locations associated with docked rideable vehicles may indicate the locations of docks, locations associated with dockless rideable vehicle may indicate the locations of the vehicles themselves, and locations associated with trains may indicate the locations of train stations at which users can board the trains.

One or more subnetworks 206, 208, 210 may be generated based on the locations. For example, one or more subnetworks 206, 208, 210 may be generated for at least two modalities 212, 214, 216. The subnetworks 206, 208, 210 may be generated to include route segments between the locations associated with the modalities 212, 214, 216. As explained above, the route segments may be generated to comply with one or more requirements (e.g., distance, time, and/or cost requirements) and route segments that do not comply with the requirements may be removed from the subnetworks 206, 208, 210. As further explained above, the types of route segments generated for the subnetworks 206, 208, 210 may differ depending on the type of modality 212, 214, 216. For example, the at least two modalities may include one or more types of rideable vehicles, such as docked scooters, docked bicycles, dockless scooters, and/or dockless bicycles. Route segments for a subnetwork associated with a type of docked vehicle may be generated to connect the locations of docks for the docked vehicle. As explained further above, route segments between the locations of docks may typically be bidirectional, but in certain instances one or more directions of travel may not be included within the subnetwork depending on dock availability status (e.g., a full status and/or an empty status). Route segments for a subnetwork associated with a type of dockless vehicle may be generated to connect the real-time locations of available dockless vehicles to locations associated with other types of modalities (e.g., docks for docked vehicles, train stations, bus stops).

Supplementary route segments 266, 268 may also be generated to connect the subnetworks 206, 208, 210. For example, supplementary route segments may be generated as walking segments that indicate walking paths between nearby locations associated with different modalities. As a specific example, supplementary route segments may be generated between docks for docked vehicles and trains stations and/or bus stops. In particular, in certain instances, particular types of modalities (e.g., dockless rideable vehicles) may be capable of traveling directly to locations associated with other modalities. In such instances, supplementary route segments 266, 268 may not need to be generated to connect subnetworks associated with such modalities to other subnetworks.

At least one route segment of the network 204 may be updated based on a changed condition (block 604). For example, the computing device 202 may detect a changed condition for at least one of the at least two modalities 212, 214, 216. In particular, one or more of the subnetworks 206, 208, 210 may be updated based on the changed condition. For example, the subnetwork 206, 208, 210 associated with the modality 212, 214, 216 for which a changed condition is detected may be updated. The type of changed condition may differ depending on the modality 212, 214, 216. For example, where the modality is transportation by docked rideable vehicle, the changed condition may include a change in status for a dock to or from a full status (e.g., having no available spots) and/or an empty status (e.g., having no available vehicles). As another example, where the modality is transportation by dockless rideable vehicle, the changed condition may include a new vehicle becoming available and/or a vehicle becoming unavailable. The subnetwork may be updated depending on the changed condition. For example, as explained above, a subnetwork associated with transportation by docked rideable vehicle may be updated to add or remove route segments beginning and/or ending at a dock's location depending on the change in the dock's status. As another example, as explained above, a subnetwork associated with transportation by dockless rideable vehicles may be updated to add or remove route segments beginning at the location of a removed and/or newly-added vehicle. In certain instances, a dockless rideable vehicle may be removed from an associated subnetwork in response to a request to reserve the vehicle. For example, vehicles may be reserved to ensure availability for a user currently following a multi-modal route, to ensure available vehicles for predicted future requests, and/or to ensure a desired distribution of vehicles within a transportation system. In certain implementations, both docked and dockless vehicles may be reserveable. In such implementations, reserving a docked vehicle may constitute a changed condition (e.g., where the reserved vehicle(s) are the last vehicles available in a particular dock) and may accordingly cause the subnetwork to update. It should be understood that, in additional or alternative implementations, other changed conditions may trigger updating of at least a portion of one of the subnetworks 206, 208, 210. For example, one or more train stations may close, requiring update of the subnetwork associated with transportation by train. Updating the network 204 may additionally include updating one or more route segments that connect the subnetworks 206, 208, 210 of the network 204. For example, supplementary route segments beginning at a dock with an empty status may be removed and/or supplementary route segments ending at a dock with a full status may be removed.

Routes 226, 236, 238 may then be generated that utilize the at least two modalities 212, 214, 216 (block 606). For example, the computing device 202 may analyze the network 204 to generate routes that utilize one or more of the modalities 212, 214, 216. In particular, the computing device 202 may analyze the network 204 to identify routes 226, 236, 238 that use two or more different modalities. As a specific example, the computing device 202 may receive a transportation request 242 from a computing device 240. The transportation request 242 may specify a first location 244 and a second location 246. The computing device 202 may analyze the network 204 to generate one or more routes 226, 236, 238 from the first location 244 to the second location 246. In generating the routes 226, 236, 238, the computing device 202 may determine one or more supplementary route segments 222, 224 between the first and second locations 244, 246 and the network 204.

The computing device 202 may search for routes within the network 204 using one or more network-based route generation techniques, such as the MLC and MCR processes discussed above. When searching the network 204 for routes 226, 236, 238, the computing device 202 may constrain a search space of the network-based processes to expedite generation of the routes 226, 236, 238. For example, the network-based processes may be configured to selectively traverse the network 204 from the first location 244 to the second location 246.

While traversing the network 204, one or more optimality constraints may be followed to constrain the search space. For example, the optimality constraints may include one or more of an optimal travel distance (e.g., shortest travel distance), an optimal cost (e.g., lowest cost), an optimal travel time (e.g., shortest travel time), an optimal vertical gain traveled by rideable vehicle (e.g., a smallest amount of vertical gain), and an optimal wait time (e.g., a shortest wait time). The optimality constraints may be initially identified by traversing the network 204 to identify routes that indicate the optimality constraint (e.g., a route with the shortest travel time, a route with the shortest travel distance, a route with the lowest cost, a route with smallest amount of vertical gain by rideable vehicle). The network 204 may then be searched for additional routes that are within a predetermined threshold amount of at least one of the optimality conditions. For example, the network 204 may be searched again for routes that are within 10 minutes of the shortest travel time, within $15 of the lowest cost route, within 5 minutes of the shortest wait time, and/or within 5 miles of the shortest travel distances. In practice, the predetermined threshold amount may vary depending on the magnitude of the associated optimality condition. For example, where the shortest travel time is 10 minutes the network 204 may be searched for routes within 4 minutes of the shortest travel time.

Additionally or alternatively, the routes may be searched at least in part based on preferences associated with a user requesting transportation. As explained further below, the computing device 202 may identify preferences associated with a user profile, and the network 204 may be searched at least in part based on the preferences. For example, if the preferences indicate that the user prefers low-cost routes, the predetermined threshold around the lowest cost route may be tightened (e.g., within $5 of the lowest cost route) and the predetermined thresholds around other criteria may be relaxed (e.g., within 20 minutes of the shortest travel time, within 10 minutes of the shortest wait time).

In still further implementations, one or more of the routes may include a segment that is not included within the network 204. For example, in certain implementations, automobiles may not be included with in the network 204. In such instances, one or more of the routes may include automobile segments that are not included within the network. As a specific example, a route may include a first segment associated with a docked bicycle, a second segment associated with a train, and a third segment associated with an automobile. In such instances, the third segment may not be determined based on the network 204, but may instead be determined based on current or predicted automobile availability (e.g., as indicated by the vehicle database 250).

At least one route may be sent to a computing device 240 (e.g., block 608). For example, the computing device 202 may select at least one of the routes 226, 236, 238 for transmittal to the computing device 240. The computing device 240 may then be configured to display the selected routes at least in part (e.g., to enable selection by a user). For example, the computing device 240 may display one or more of the modalities used during the selected route and/or may display at least a portion of the route itself. At block 606, the computing device 202 may generate many routes between the first location and the second location. For example, in practice, tens or hundreds of routes may be generated. Accordingly, the computing device 202 may select a subset of the routes (e.g., 1-10 routes) to send to the computing device for display (e.g., to improve visual clarity and reduce visual clutter for displayed routes).

The subset of the routes sent to the computing device may be selected based on particular criteria. For example, routes that are optimal along various aspects may be selected to be sent to the computing device 240. As a specific example, one or more of the lowest cost route, the route with the shortest wait time, the route with the shortest travel time, and/or the route with the least traffic may be selected. Additionally or alternatively, routes may be selected based on preferences associated with a user that transmitted the transmission request for which routes are generated. For example, the computing device 202 may determine preferences that are associated with a user profile that created the transportation request. The preferences may be based on information provided by the user (e.g., preferences expressly indicated by the user) and/or information derived from previous trips completed and/or rejected by the user. As a specific example, the preferences may specify that the user prefers trips with lower cost, trips with shorter travel time, trips with shorter wait times, trips with less traffic, and/or trips that utilize particular modalities (e.g., the user may prefer rideable modalities over buses or trains, may prefer cars over buses, and/or may dislike routes that use scooters). The routes selected to be sent to the computing device 240 may comply with the preferences. For example, if a user prefers a particular modality, additional routes using the modality may be selected. As another example, if a user dislikes a particular modality, routes using the modality may not be sent to the computing device 240. As a further example, if a user prefers lower-cost routes, the lowest-cost route may be selected in addition to other lower cost routes, and higher-cost routes may not be sent to the computing device 240, even if faster.

The routes selected to send to the computing device 240 may also depend on current conditions. For example, if current weather conditions indicate that it is raining or snowing, routes using rideable vehicles may be excluded. As another example, if current conditions for trains or buses (e.g., conditions measured using location data and/or received from a transit system provider) indicate delays on particular bus routes or train lines, routes using the delayed bus routes or train lines may be excluded and/or may be sent to the computing device 240 with an indication that delays are currently occurring. Once selected, the one or more routes may be transmitted to the computing device 240 for display. For example, the routes may be transmitted to an application (e.g., a transportation application) executing on the computing device 240 via the Internet or another network for display on the computing device 240.

The routes sent to the computing device 240 may be further selected based on other criteria. For instance, a type of vehicle used during a route segment may be compared to a length of the segment. For example, the routes may include a first route with an electric bike associated with a 1-mile segment and a second route with a non-electric bike associated with a similar 1-mile segment. In such instances, it may be disadvantageous to utilize and/or relocate an electric bike for such short segments. Accordingly, the second route may be selected to be sent to the computing device 240. In additional or alternative instances, routes may be selected based on how completion of the route will redistribute vehicles. For example, if a first route redirects a vehicle (e.g., a scooter) from an area of high demand for the vehicle (e.g., for scooters) to an area of low demand for the vehicle (e.g., for scooters) and a second route redirects a vehicle from an area of high demand to an area of medium demand, the second route may be selected to send to the computing device 240. In still further implementations, the routes may be selected based on a number of transfers (e.g., a number of transfers between vehicles and/or modalities). For example, a first route may include a first train segment associated with a first train line, a second train segment associated with a second train line, and a scooter segment. A second route may include a scooter segment and a bus segment. The first route may therefore have two transfers and the second route may have one transfer. Accordingly, the second route may be selected to send to the computing device 240. In certain instances, a maximum preferred number of segments may be included within preferences associated with a user.

The method 600 therefore enables the computing device 202 to generate multimodal routes for transportation between locations specified in transportation requests received from other computing devices (e.g., mobile devices associated with users). In particular, by efficiently generating and updating subnetworks, especially subnetworks associated with rideable modalities, the method 600 enables the computing device to generate multimodal routes utilizing network-based route generation processes. In particular, the subnetworks associated with docked rideable modalities may be generated to limit the amount of route generation that occurs when a status of a dock changes to a full status or an empty status. Similarly, the subnetworks for dockless rideable modalities are generated to capitalize on the greater flexibility of these vehicles while also ensuring that only necessary route segments are removed and/or generated as vehicles become available and/or unavailable. As explained above, such techniques address the exponentially increasing computing resources required to update networks and subnetworks as locations and availabilities of vehicles change. By reducing the computing resources required, network-based techniques are enabled for dynamic transportation modalities such as rideable vehicles. Furthermore, to address the added complexities of including additional modalities in the search space of the network used to generate the routes, the method 600 can improve search times by constraining the search space according to multiple criteria. In this way, the method 600 allows the computing device 202 to generate new types of multimodal routes in an efficient and responsive manner that utilize docked rideable modalities and/or dockless rideable modalities.

In certain instances, the method 600 may be performed to update a route that is currently in progress. For example, a user may be following a previously-generated route and may have deviated from the route and/or an availability of a vehicle used in a future route segment may have changed. In such instances, an updated route may be generated by repeating at least a portion of the method 600 (e.g., the blocks 606, 608) to generate an updated route from the user's current location (e.g., the current location of the computing device 240) to the user's destination (e.g., the second location of the transportation request). Additionally, if a user is currently using a particular modality (e.g., using a dockless scooter, riding on a particular train line), the generated and/or selected routes may be identified to only include routes that utilize the same modality to enable a seamless transition from the user's previous route to the updated route.

Figure 7:
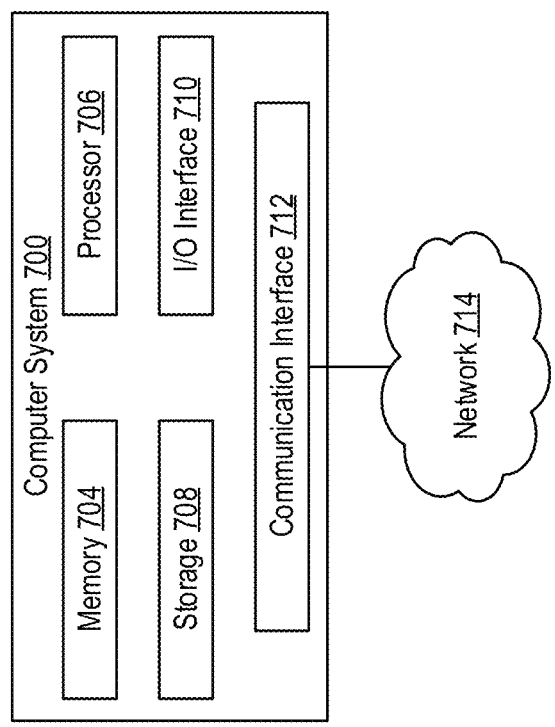
FIG. 7 illustrates a computer system according to an exemplary embodiment of the present disclosure.

FIG. 7 illustrates an example computer system 700 that may be utilized to implement one or more of the devices and/or components of FIG. 2, such as the computing devices 202, 240 and/or the vehicle database 250. In particular embodiments, one or more computer systems 700 perform one or more steps of one or more methods described or illustrated herein. In particular embodiments, one or more computer systems 700 provide the functionalities described or illustrated herein. In particular embodiments, software running on one or more computer systems 700 performs one or more steps of one or more methods described or illustrated herein or provides the functionalities described or illustrated herein. Particular embodiments include one or more portions of one or more computer systems 700. Herein, a reference to a computer system may encompass a computing device, and vice versa, where appropriate. Moreover, a reference to a computer system may encompass one or more computer systems, where appropriate.

This disclosure contemplates any suitable number of computer systems 700. This disclosure contemplates the computer system 700 taking any suitable physical form. As example and not by way of limitation, the computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, the computer system 700 may include one or more computer systems 700; be unitary or distributed; span multiple locations; span multiple machines; span multiple data centers; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 706, memory 704, storage 708, an input/output (I/O) interface 710, and a communication interface 712. Although this disclosure describes and illustrates a particular computer system having a particular number of particular components in a particular arrangement, this disclosure contemplates any suitable computer system having any suitable number of any suitable components in any suitable arrangement.

In particular embodiments, the processor 706 includes hardware for executing instructions, such as those making up a computer program. As an example and not by way of limitation, to execute instructions, the processor 706 may retrieve (or fetch) the instructions from an internal register, an internal cache, memory 704, or storage 708; decode and execute the instructions; and then write one or more results to an internal register, internal cache, memory 704, or storage 708. In particular embodiments, the processor 706 may include one or more internal caches for data, instructions, or addresses. This disclosure contemplates the processor 706 including any suitable number of any suitable internal caches, where appropriate. As an example and not by way of limitation, the processor 706 may include one or more instruction caches, one or more data caches, and one or more translation lookaside buffers (TLBs). Instructions in the instruction caches may be copies of instructions in memory 704 or storage 708, and the instruction caches may speed up retrieval of those instructions by the processor 706. Data in the data caches may be copies of data in memory 704 or storage 708 that are to be operated on by computer instructions; the results of previous instructions executed by the processor 706 that are accessible to subsequent instructions or for writing to memory 704 or storage 708; or any other suitable data. The data caches may speed up read or write operations by the processor 706. The TLBs may speed up virtual-address translation for the processor 706. In particular embodiments, processor 706 may include one or more internal registers for data, instructions, or addresses. This disclosure contemplates the processor 706 including any suitable number of any suitable internal registers, where appropriate. Where appropriate, the processor 706 may include one or more arithmetic logic units (ALUs), be a multi-core processor, or include one or more processors 706. Although this disclosure describes and illustrates a particular processor, this disclosure contemplates any suitable processor.

In particular embodiments, the memory 704 includes main memory for storing instructions for the processor 706 to execute or data for processor 706 to operate on. As an example, and not by way of limitation, computer system 700 may load instructions from storage 708 or another source (such as another computer system 700) to the memory 704. The processor 706 may then load the instructions from the memory 704 to an internal register or internal cache. To execute the instructions, the processor 706 may retrieve the instructions from the internal register or internal cache and decode them. During or after execution of the instructions, the processor 706 may write one or more results (which may be intermediate or final results) to the internal register or internal cache. The processor 706 may then write one or more of those results to the memory 704. In particular embodiments, the processor 706 executes only instructions in one or more internal registers or internal caches or in memory 704 (as opposed to storage 708 or elsewhere) and operates only on data in one or more internal registers or internal caches or in memory 704 (as opposed to storage 708 or elsewhere). One or more memory buses (which may each include an address bus and a data bus) may couple the processor 706 to the memory 704. The bus may include one or more memory buses, as described in further detail below. In particular embodiments, one or more memory management units (MMUs) reside between the processor 706 and memory 704 and facilitate accesses to the memory 704 requested by the processor 706. In particular embodiments, the memory 704 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories 704, where appropriate. Although this disclosure describes and illustrates particular memory implementations, this disclosure contemplates any suitable memory implementation.

In particular embodiments, the storage 708 includes mass storage for data or instructions. As an example and not by way of limitation, the storage 708 may include a hard disk drive (HDD), a floppy disk drive, flash memory, an optical disc, a magneto-optical disc, magnetic tape, or a Universal Serial Bus (USB) drive or a combination of two or more of these. The storage 708 may include removable or non-removable (or fixed) media, where appropriate. The storage 708 may be internal or external to computer system 700, where appropriate. In particular embodiments, the storage 708 is non-volatile, solid-state memory. In particular embodiments, the storage 708 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 708 taking any suitable physical form. The storage 708 may include one or more storage control units facilitating communication between processor 706 and storage 708, where appropriate. Where appropriate, the storage 708 may include one or more storages 708. Although this disclosure describes and illustrates particular storage, this disclosure contemplates any suitable storage.

In particular embodiments, the I/O Interface 710 includes hardware, software, or both, providing one or more interfaces for communication between computer system 700 and one or more I/O devices. The computer system 700 may include one or more of these I/O devices, where appropriate. One or more of these I/O devices may enable communication between a person (i.e., a user) and computer system 700. As an example and not by way of limitation, an I/O device may include a keyboard, keypad, microphone, monitor, screen, display panel, mouse, printer, scanner, speaker, still camera, stylus, tablet, touch screen, trackball, video camera, another suitable I/O device or a combination of two or more of these. An I/O device may include one or more sensors. Where appropriate, the I/O Interface 710 may include one or more device or software drivers enabling processor 706 to drive one or more of these I/O devices. The I/O interface 710 may include one or more I/O interfaces 710, where appropriate. Although this disclosure describes and illustrates a particular I/O interface, this disclosure contemplates any suitable I/O interface or combination of I/O interfaces.

In particular embodiments, communication interface 712 includes hardware, software, or both providing one or more interfaces for communication (such as, for example, packet-based communication) between computer system 700 and one or more other computer systems 700 or one or more networks 714. As an example and not by way of limitation, communication interface 712 may include a network interface controller (NIC) or network adapter for communicating with an Ethernet or any other wire-based network or a wireless NIC (WNIC) or wireless adapter for communicating with a wireless network, such as a Wi-Fi network. This disclosure contemplates any suitable network 714 and any suitable communication interface 712 for the network 714. As an example and not by way of limitation, the network 714 may include one or more of an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a Bluetooth® WPAN), a WI-FI network, a WI-MAX network, a cellular telephone network (such as, for example, a Global System for Mobile Communications (GSM) network), or any other suitable wireless network or a combination of two or more of these. Computer system 700 may include any suitable communication interface 712 for any of these networks, where appropriate. Communication interface 712 may include one or more communication interfaces 712, where appropriate. Although this disclosure describes and illustrates a particular communication interface implementation, this disclosure contemplates any suitable communication interface implementation.

The computer system 702 may also include a bus. The bus may include hardware, software, or both and may communicatively couple the components of the computer system 700 to each other. As an example and not by way of limitation, the bus may include an Accelerated Graphics Port (AGP) or any other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local bus (VLB), or another suitable bus or a combination of two or more of these buses. The bus may include one or more buses, where appropriate. Although this disclosure describes and illustrates a particular bus, this disclosure contemplates any suitable bus or interconnect.

Aspects of the present disclosure may be performed by entities and systems configured to provide transportation. For example, transportation providers may implement one or more of the above-described systems and methods. Transportation providers may include transportation networking companies (TNCs). TNCs may implement a transportation matching system that matches transportation requests with a dynamic transportation network of vehicles. In certain instances, the vehicles may include road-going vehicles and/or personal mobility vehicles. In some examples, some of the vehicles may be standard commercially available vehicles and some of the vehicles may be owned and/or operated by individuals. In some implementations, the vehicles may additionally or alternatively be autonomous (or partly autonomous). Accordingly, throughout the instant disclosure, references to a "vehicle operator" (or an "operator") may, where appropriate, refer to a human driving a vehicle, an autonomous vehicle control system, an autonomous vehicle, an owner of an autonomous vehicle, an operator of an autonomous vehicle, an attendant of an autonomous vehicle, a requesting user piloting a vehicle, and/or an autonomous system for piloting a vehicle. In one example, the TNC may implement multiple transportation systems, where each transportation system is responsible for coordinating transportation matching for a specific geographic region or set quantity of vehicles.

The transportation system may communicate with computing devices associated with the vehicles in the network, which may be separate computing devices and/or may be computing devices that are integrated into the respective vehicles. In some examples, one or more of the computing devices may be mobile devices, such as a smart phone. Additionally or alternatively, one or more of the computing devices may be tablet computers, personal digital assistants, or any other type or form of mobile computing device. Additionally, one or more of the computing devices may include wearable computing devices (e.g., a driver-wearable computing device), such as smart glasses, smart watches, etc. In some examples, one or more of the computing devices may be devices suitable for temporarily mounting in a vehicle (e.g., for use by a requestor and/or an operator for a transportation matching application, a navigation application, and/or any other application suited for use by requestors and/or operators). Additionally or alternatively, one or more of the computing devices may be devices suitable for installing in a vehicle and/or may be a vehicle's computer that has a transportation management system application installed on the computer to provide transportation services to transportation requestors and/or communicate with the transportation system.

Figure 8:
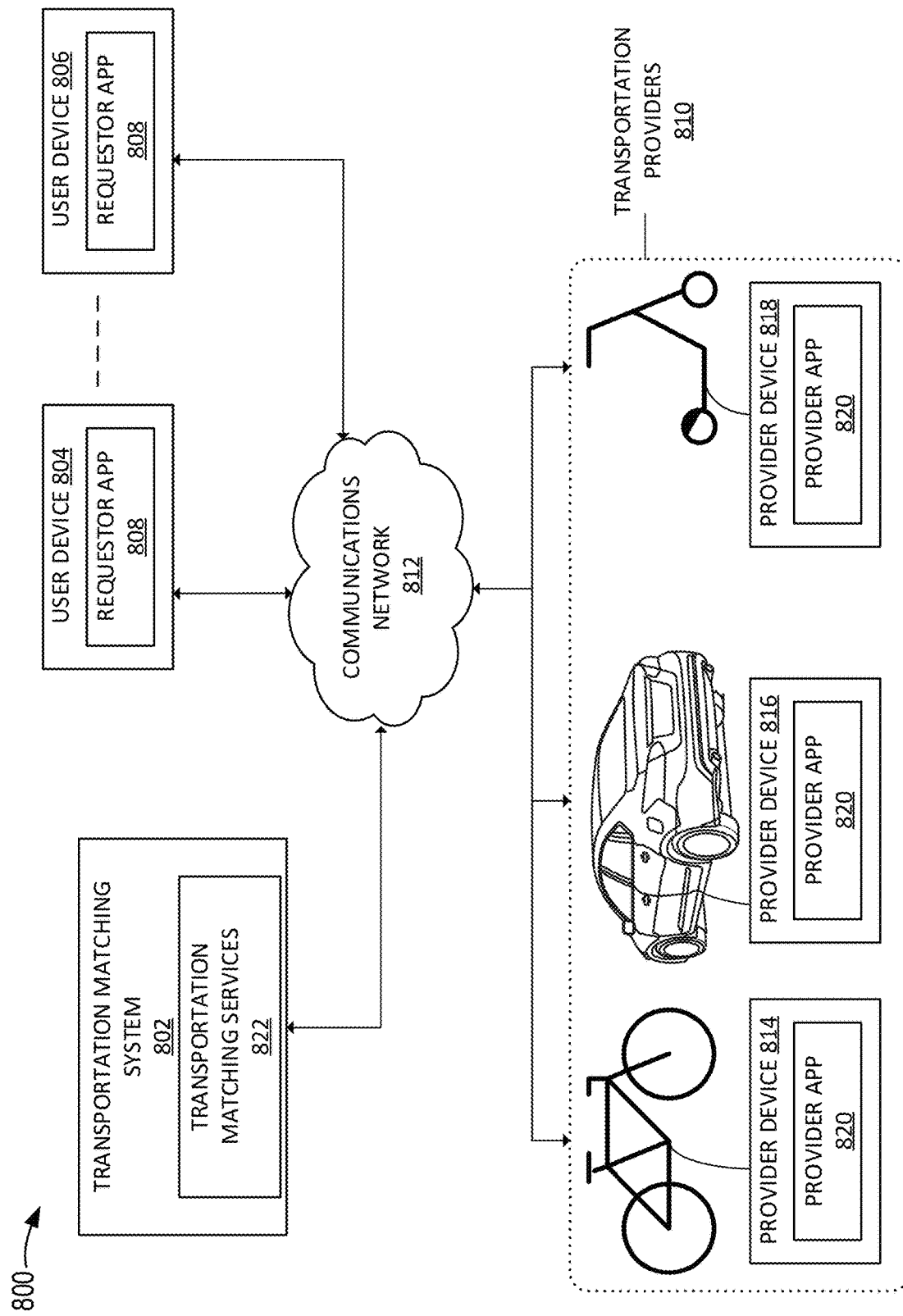
FIG. 8 illustrates a transportation matching system according to exemplary embodiments of the present disclosure.

FIG. 8 illustrates an example system 800 for matching transportation requests to a network of transportation vehicles according to one embodiment of the present disclosure. As illustrated, a transportation matching system 802 may communicate with user devices 804-806 requesting transportation. In some examples, the user devices 804-806 requesting transportation may include a requestor app 808 implemented by the transportation provider. The requestor app 808 may represent any application, program, and/or module that may provide one or more services related to requesting transportation services. For example, the requestor app 808 may include a transportation matching application for requestors. In some examples, the requestor app may match the user of the requestor app 808 (e.g., a transportation requestor) with transportation providers 810 through communication with the transportation matching system 802 via the communications network 812. In addition, the requestor app 808 may provide the transportation matching system 802 with information about a requestor (including, e.g., the current location of the requestor) to enable the transportation matching system 802 to provide dynamic transportation matching services for the requestor and one or more transportation providers 810, each of which may include a provider device 814, 816, 818. Each provider device may include a provider app 820, which may be any application program and/or set of instructions that may provide one or more services related to operating a vehicle and/or providing transportation matching services in conjunction with the transportation matching system 802 and the requestor app 808.

In some examples, the requestor app 808 may coordinate communications and/or a payment between a requestor and a transportation provider 810. According to some embodiments, the requestor app 808 may provide a map service, a navigation service, a traffic notification service, and/or a geolocation service. The provider app 820 may provide similar functions. In other implementations, the requestor app 808 may allow users to request access to certain vehicles, such as personal mobility vehicles (e.g., bicycles and/or scooters).

The transportation matching system 802 may arrange transportation on an on-demand and/or ad-hoc basis by, e.g., matching one or more transportation requestors with one or more transportation providers 810. For example, the transportation matching system 802 may provide one or more transportation matching services 822 for a networked transportation service, a ridesourcing service, a taxicab service, a car-booking service, an autonomous vehicle service, a personal mobility vehicle service, or some combination and/or derivative thereof. The transportation matching system 802 may include and/or interface with any of a variety of subsystems that may implement, support, and/or improve the transportation matching services 822. For example, the transportation matching services 822 may include or otherwise interface with a matching system (e.g., that matches requestors to ride opportunities and/or that arranges for requestors and/or providers to meet), a mapping system, a routing system (e.g., to help a provider reach a requestor, to help a requestor reach a provider, and/or to help a provider reach a destination), a rating system (e.g., to rate and/or gauge the reliability of a requestor and/or a provider), a payment system, and/or an autonomous or semi-autonomous driving system. The transportation matching system 802 may be implemented on various platforms, including a requestor-owned mobile device, a computing system installed in a vehicle, a server computer system, or any other hardware platform capable of providing transportation matching services to one or more requestors and/or providers.

Herein, a computer-readable non-transitory storage medium or media may include one or more semiconductor-based or other types of integrated circuits (ICs) (e.g., field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The invention claimed is:

1. A system comprising:
a processor; and
a memory storing instructions which, when executed by the processor, cause the processor to:
   generate a network of route segments for a plurality of modalities by:
      generating a first subnetwork of segments corresponding to a docked rideable modality comprising a first set of indicators to add or remove one or more of the first subnetwork of segments based on availability;
      generating a second subnetwork of segments corresponding to a dockless rideable modality comprising a second set of indicators to add or remove one or more of the second subnetwork of segments based on distance thresholds;
      generating a third subnetwork of segments corresponding to at least one additional modality comprising at least one of an automobile modality, a bus modality, or a train modality comprising a third set of indicators to add or remove one or more of the third subnetwork of segments; and
      generating connecting segments between the first subnetwork, the second subnetwork, and the third subnetwork;
   communicate with a computing device of a transportation matching system to determine a changed condition by:
      receiving status updates of at least one docked rideable vehicle availability by communicating with a dock or at least one docked rideable vehicle corresponding to the first subnetwork of segments; or
      receiving additional status updates of at least one dockless rideable vehicle range by communicating with at least one dockless rideable vehicle corresponding to the second subnetwork of segments;
   update one or more of the first set of indicators for one or more segments of the first subnetwork of segments based on the changed condition from status updates of the at least one docked rideable vehicle to indicate segment availability of the one or more segments of the first subnetwork of segments;
   update one or more of the second set of indicators for the second subnetwork of segments based on the changed condition from the additional status updates of the at least one dockless rideable vehicle to indicate segment availability of the one or more segments of the second subnetwork of segments;
   update the network of route segments by adding or removing the one or more segments from the first subnetwork of segments utilizing the one or more of the first set of indicators or the one or more segments from the second subnetwork of segments utilizing the one or more of the second set of indicators;
   in response to receiving a transportation request from a requestor computing device, generate, based on the network of route segments for the plurality of modalities and the connecting segments between the first subnetwork, the second subnetwork, and the third subnetwork, one or more routes comprising the at least one additional modality and at least one of the docked rideable modality from the updated network of route segments based on the first set of indicators or the dockless rideable modality from the updated network of route segments based on the second set of indicators; and
   transmit, for display via a user interface of the requestor computing device, the one or more routes corresponding to the transportation request.

2. The system of claim 1, wherein the instructions further cause the processor to update the network of route segments by:
   determine an additional changed condition based on additional status updates of the at least one docked rideable vehicle availability or additional status updates of the at least one dockless rideable vehicle range;
   modify the one or more indicators of the first set of indicators based on the additional changed condition;
   modify the one or more indicators of the second set of indicators based on the additional changed condition; and
   update the network of route segments by adding or removing an additional one or more segments from the first subnetwork of segments utilizing the one or more modified indicators of first set of indicators or an additional one or more segments from the second subnetwork of segments utilizing the one or more modified indicators of the second set of indicators.

3. The system of claim 1, wherein the instructions further cause the processor to generate the one or more routes by:
generating the first subnetwork of segments utilizing at least one docked rideable vehicle battery charge level of at least one docked rideable vehicle; or
generating the second subnetwork of segments utilizing at least one dockless rideable vehicle battery charge level of at least one dockless rideable vehicle.

4. The system of claim 3, wherein the at least one docked rideable vehicle comprises an electric motor bicycle and wherein the at least one dockless rideable vehicle comprises an electric motor scooter.

5. The system of claim 1, wherein the instructions further cause the processor to, based on a user interaction with the transportation request on the requestor computing device, updating the network of route segments based on the availability of the at least one additional modality and the at least one of the docked rideable modality from the updated network of route segments based on the first set of indicators or the dockless rideable modality from the updated network of route segments based on the second set of indicators.

6. The system of claim 1, wherein the instructions further cause the processor to generate the one or more routes by generating walking segments between at least one of (i) a first location corresponding to a transportation request and the network or (ii) a second location corresponding to the transportation request and the network.

7. The system of claim 1, wherein the instructions further cause the processor to generate the first subnetwork of segments and the third subnetwork of segments utilizing bi-directional segments.

8. The system of claim 1, wherein the instructions further cause the processor to determine the changed condition by determining that at least one dockless rideable vehicle is no longer available or that at least one dockless rideable vehicle is available.

9. The system of claim 1, wherein the instructions further cause the processor to generateing the network by removing at least one route segment that does not meet at least one of (i) a time requirement, (ii) a cost requirement, (iii) a distance requirement, or (iv) a vertical gain requirement.

10. The system of claim 1, wherein the instructions further cause the processor to select the one or more routes based on a preference regarding at least one of cost, travel time, travel distance, wait times, number of transfers, traffic, or modalities utilized during transportation.

11. The system of claim 1, wherein the instructions further cause the processor to generate, for the transportation request, multiple routes from the network of route segments based on optimality constraints including two or more of a travel time, a travel distance, a wait time, a number of transfers, an amount of traffic congestion, or an amount of vertical gain.

12. The system of claim 11, wherein the instructions further cause the processor to transmit, for display via the user interface of the requestor computing device, the multiple routes based on the optimality constraints.

13. A method comprising:
generating a network of route segments for a plurality of modalities by:
generating a first subnetwork of segments corresponding to a docked rideable modality comprising a first set of indicators to add or remove one or more of the first subnetwork of segments based on availability;
generating a second subnetwork of segments corresponding to a dockless rideable modality comprising a second set of indicators to add or remove one or more of the second subnetwork of segments based on distance thresholds;
generating a third subnetwork of segments corresponding to at least one additional modality comprising at least one of an automobile modality, a bus modality, or a train modality comprising a third set of indicators to add or remove one or more of the third subnetwork of segments; and
generating connecting segments between the first subnetwork, the second subnetwork, and the third subnetwork;
communicating with a computing device of a transportation matching system to determine a changed condition by:
receiving status updates of at least one docked rideable vehicle availability by communicating with a dock or at least one docked rideable vehicle corresponding to the first subnetwork of segments; or
receiving additional status updates of at least one dockless rideable vehicle range by communicating with at least one dockless rideable vehicle corresponding to the second subnetwork of segments;
updating one or more of the first set of indicators for one or more segments of the first subnetwork of segments based on the changed condition from status updates of the at least one docked rideable vehicle to indicate segment availability of the one or more segments of the first subnetwork of segments;
updating one or more of the second set of indicators for the second subnetwork of segments based on the changed condition from the additional status updates of the at least one dockless rideable vehicle to indicate segment availability of the one or more segments of the second subnetwork of segments;
updating the network of route segments by adding or removing the one or more segments from the first subnetwork of segments utilizing the one or more of the first set of indicators or the one or more segments from the second subnetwork of segments utilizing the one or more of the second set of indicators;
in response to receiving a transportation request from a requestor computing device, generating, based on the network of route segments for the plurality of modalities and the connecting segments between the first subnetwork, the second subnetwork, and the third subnetwork, one or more routes comprising the at least one additional modality and at least one of the docked rideable modality from the updated network of route segments based on the first set of indicators or the dockless rideable modality from the updated network of route segments based on the second set of indicators; and
transmitting, for display via a user interface of the requestor computing device, the one or more routes corresponding to the transportation request.

14. The method of claim 13, further comprising updating the network of route segments by updating the third subnetwork of segments based on the changed condition.

15. The method of claim 13, further comprising transmitting, for display via the user interface of the requestor computing device, multiple routes based on multiple optimality constraints for the network of route segments in relation to the transportation request.

16. The method of claim 13, further comprising generating, based on the network of route segments for the plurality of modalities and the connecting segments between the first subnetwork, the second subnetwork, and the third subnetwork, the one or more routes based on a modality preference corresponding to a user of the requestor computing device.

17. The method of claim 16, further comprising generating the one or more routes by generating walking segments between at least one of (i) a first location and the network or (ii) a second location and the network.

18. The method of claim 13, further comprising determining the changed condition by determining that a dock is full or empty, determining that at least one dockless rideable vehicle is no longer available, or determining that at least one dockless rideable vehicle is available.

19. The method of claim 13, further comprising generating at least one of the one or more routes based on an external route segment not included within the network.

20. A non-transitory, computer-readable medium storing instructions which, when executed by a processor, cause the processor to:
  generate a network of route segments for a plurality of modalities by:
    generating a first subnetwork of segments corresponding to a docked rideable modality comprising a first set of indicators to add or remove one or more of the first subnetwork of segments based on availability;
    generating a second subnetwork of segments corresponding to a dockless rideable modality comprising a second set of indicators to add or remove one or more of the second subnetwork of segments based on distance thresholds;
    generating a third subnetwork of segments corresponding to at least one additional modality comprising at least one of an automobile modality, a bus modality, or a train modality comprising a third set of indicators to add or remove one or more of the third subnetwork of segments; and
    generating connecting segments between the first subnetwork, the second subnetwork, and the third subnetwork;
  communicate with a computing device of a transportation matching system to determine a changed condition by:
    receiving status updates of at least one docked rideable vehicle availability by communicating with a dock or at least one docked rideable vehicle corresponding to the first subnetwork of segments; or
    receiving additional status updates of at least one dockless rideable vehicle range by communicating with at least one dockless rideable vehicle corresponding to the second subnetwork of segments;
  update one or more of the first set of indicators for one or more segments of the first subnetwork of segments based on the changed condition from status updates of the at least one docked rideable vehicle to indicate segment availability of the one or more segments of the first subnetwork of segments;
  update one or more of the second set of indicators for the second subnetwork of segments based on the changed condition from the additional status updates of the at least one dockless rideable vehicle to indicate segment availability of the one or more segments of the second subnetwork of segments;
  update the network of route segments by adding or removing the one or more segments from the first subnetwork of segments utilizing the one or more of the first set of indicators or the one or more segments from the second subnetwork of segments utilizing the one or more of the second set of indicators;
  in response to receiving a transportation request from a requestor computing device, generate, based on the network of route segments for the plurality of modalities and the connecting segments between the first subnetwork, the second subnetwork, and the third subnetwork, one or more routes comprising the at least one additional modality and at least one of the docked rideable modality from the updated network of route segments based on the first set of indicators or the dockless rideable modality from the updated network of route segments based on the second set of indicators; and
  transmit, for display via a user interface of the requestor computing device, the one or more routes corresponding to the transportation request.

* * * * *